US011608002B2

(12) United States Patent
Ellis et al.

(10) Patent No.: US 11,608,002 B2
(45) Date of Patent: Mar. 21, 2023

(54) TRANSPORTATION RECEPTACLE FOR VEHICLES

(71) Applicant: UATC, LLC, San Francisco, CA (US)

(72) Inventors: Johad Husseini Ellis, Pittsburgh, PA (US); Christopher Matthew D'Eramo, Bethel Park, PA (US)

(73) Assignee: UATC, LLC, Mountain View, CA (US)

( * ) Notice: Subject to any disclaimer, the term of this patent is extended or adjusted under 35 U.S.C. 154(b) by 999 days.

(21) Appl. No.: 16/171,848

(22) Filed: Oct. 26, 2018

(65) Prior Publication Data

US 2020/0047675 A1 Feb. 13, 2020

Related U.S. Application Data

(60) Provisional application No. 62/748,869, filed on Oct. 22, 2018, provisional application No. 62/716,047, filed on Aug. 8, 2018.

(51) Int. Cl.
*B60R 5/04* (2006.01)
*B60R 9/10* (2006.01)
(Continued)

(52) U.S. Cl.
CPC ............... *B60R 5/041* (2013.01); *B60R 9/06* (2013.01); *B60R 9/10* (2013.01); *G07C 9/00896* (2013.01); *G07C 9/30* (2020.01); *B60R 2300/301* (2013.01); *B60R 2300/302* (2013.01); *G07C 2009/0092* (2013.01)

(58) Field of Classification Search
CPC .. B60R 5/041; B60R 9/06; B60R 9/10; B60R 2300/301; B60R 2300/302; G07C 9/30; G07C 9/00896; G07C 2009/0092
See application file for complete search history.

(56) References Cited

U.S. PATENT DOCUMENTS 1,758,826 A 5/1930 Dellert
1,911,224 A 5/1933 Dellert
(Continued)

FOREIGN PATENT DOCUMENTS

CN 203623483 6/2014
CN 105189313 12/2015
(Continued)

*Primary Examiner* — Nabil H Syed
(74) *Attorney, Agent, or Firm* — Dority & Manning, P.A.

(57) ABSTRACT

Systems, methods, tangible non-transitory computer-readable media, and devices associated with the operation of a vehicle are provided. For example, a receptacle system can determine states of a receptacle of a vehicle. Further, the states of the receptacle can be associated with accommodation of objects by the receptacle. The receptacle system can receive object data that includes information associated with accommodation of the objects by the receptacle. The receptacle system can also determine operations associated with the receptacle based at least in part on the object data and the states of the receptacle. Furthermore, the receptacle system can generate control signals to perform the operations associated with the receptacle which can include transporting objects in the receptacle, charging objects in the receptacle, extending the receptacle, or retracting the receptacle.

20 Claims, 12 Drawing Sheets

(51) Int. Cl.
  *B60R 9/06*   (2006.01)
  *G07C 9/00*   (2020.01)
  *G07C 9/30*   (2020.01)

(56) References Cited

U.S. PATENT DOCUMENTS

| | | | |
|---|---|---|---|
| 2,132,279 | A | 10/1938 | Wicknick et al. |
| 2,563,347 | A | 8/1951 | Long |
| 2,642,119 | A | 6/1953 | Dary |
| 3,463,539 | A | 8/1969 | Racine et al. |
| 3,632,161 | A | 1/1972 | Arfaras et al. |
| 3,637,253 | A | 1/1972 | Maule et al. |
| 5,653,262 | A | 8/1997 | Hanemaayer |
| 5,738,408 | A | 4/1998 | Wu |
| 6,030,037 | A | 2/2000 | Ritch et al. |
| 6,264,261 | B1 | 7/2001 | Krafcik |
| 6,338,518 | B1 | 1/2002 | D'Annunzio et al. |
| 6,350,972 | B1 | 2/2002 | Wright et al. |
| 6,540,279 | B1 | 3/2003 | Bargiel |
| 6,925,679 | B2 | 8/2005 | Wallach et al. |
| 7,066,519 | B2 | 6/2006 | Rhodes et al. |
| 7,090,274 | B1 | 8/2006 | Khan et al. |
| 7,156,442 | B2 | 1/2007 | McManus et al. |
| 8,010,230 | B2 | 8/2011 | Zini et al. |
| 8,182,016 | B2 | 5/2012 | Kaip et al. |
| 8,186,735 | B2 | 5/2012 | Maceri et al. |
| 9,256,852 | B1 | 2/2016 | Myllymaki |
| 9,510,682 | B2 | 12/2016 | Hasegawa et al. |
| 9,533,625 | B2 | 1/2017 | Krishnan et al. |
| 2005/0028543 | A1 | 2/2005 | Whitehead et al. |
| 2007/0156540 | A1 | 7/2007 | Koren et al. |
| 2008/0185893 | A1 | 8/2008 | Behrens et al. |
| 2010/0052374 | A1 | 3/2010 | Bell et al. |
| 2015/0006005 | A1 | 1/2015 | Yu et al. |
| 2015/0330109 | A1* | 11/2015 | Tepper .............. B62H 3/08 700/237 |
| 2015/0379468 | A1 | 12/2015 | Danaher |
| 2016/0099927 | A1* | 4/2016 | Oz .................. G07C 5/0808 726/9 |
| 2016/0280095 | A1 | 9/2016 | Frye et al. |
| 2017/0354996 | A1 | 2/2017 | Lim et al. |
| 2017/0166173 | A1 | 6/2017 | Lauffer et al. |
| 2018/0079278 | A1 | 3/2018 | Kirpichnikov et al. |
| 2018/0093617 | A1* | 4/2018 | Kuhlbach ............ B60L 53/305 |
| 2018/0157945 | A1* | 6/2018 | Clark ................ G06K 7/10415 |
| 2020/0055459 | A1* | 2/2020 | Perez Barrera ........... B60R 9/06 |

FOREIGN PATENT DOCUMENTS

| | | |
|---|---|---|
| DE | 4200476 | 7/1993 |
| DE | 19822694 | 11/1999 |
| DE | 102010055365 | 7/2011 |
| EP | 1247473 | 10/2002 |
| EP | 2258579 | 8/2010 |
| FR | 2920011 | 2/2009 |
| JP | 6270307 | 12/2013 |
| JP | 6262937 | 1/2014 |
| KR | 100783510 | 6/2007 |
| WO | WO2012060462 | 5/2012 |
| WO | WO2017156586 | 9/2017 |

\* cited by examiner

_US 11,608,002 B2_

TRANSPORTATION RECEPTACLE FOR VEHICLES

RELATED APPLICATIONS

The present application is based on and claims benefit of U.S. Provisional Patent Application No. 62/748,869 having a filing date of Oct. 22, 2018 and U.S. Provisional Patent Application No. 62/716,047 having a filing date of Aug. 8, 2018, which are incorporated by reference herein.

FIELD

The present disclosure relates generally to a receptacle for transporting and charging objects on vehicles.

BACKGROUND

Vehicles, including autonomous vehicles, are often equipped with various vehicle control systems that are used to perform various functions. The vehicle control systems can be used in conjunction with a variety of components that facilitate performance of these functions by the autonomous vehicle. However, the functions an autonomous vehicle is expected to perform can change over time. As such, there exists a need for an autonomous vehicle that is able to more effectively perform those functions by adapting to its environment and the demands placed upon the autonomous vehicle by that environment and its users.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of operating a vehicle. The computer-implemented method can include determining, by a computing system including one or more computing devices, one or more states of a receptacle of a vehicle. The one or more states of the receptacle can be associated with accommodation of one or more objects by the receptacle. The computer-implemented method can include receiving, by the computing system, object data including information associated with accommodation of the one or more objects by the receptacle. The computer-implemented method can also include determining, by the computing system, one or more operations associated with the receptacle based at least in part on the object data and the one or more states of the receptacle. Furthermore, the computer-implemented method can include generating, by the computing system, one or more control signals to perform the one or more operations associated with the receptacle.

Another example aspect of the present disclosure is directed to a computing device including: one or more processors; a memory including one or more computer-readable media, the memory storing computer-readable instructions that when executed by the one or more processors cause the one or more processors to perform operations. The operations can include determining one or more states of a receptacle of a vehicle. The one or more states of the receptacle can be associated with accommodation of one or more objects by the receptacle. The operations can also include receiving object data including information associated with accommodation of the one or more objects by the receptacle. The operations can include determining one or more operations associated with the receptacle based at least in part on the object data and the one or more states of the receptacle. Furthermore, the operations can include generating one or more control signals to perform the one or more operations associated with the receptacle.

Another example aspect of the present disclosure is directed to one or more tangible non-transitory computer-readable media storing computer-readable instructions that when executed by one or more processors cause the one or more processors to perform operations. The operations can include determining one or more states of a receptacle of a vehicle. The one or more states of the receptacle can be associated with accommodation of one or more objects by the receptacle. The operations can also include receiving object data including information associated with accommodation of the one or more objects by the receptacle. The operations can include determining one or more operations associated with the receptacle based at least in part on the object data and the one or more states of the receptacle. Furthermore, the operations can include generating one or more control signals to perform the one or more operations associated with the receptacle.

Other example aspects of the present disclosure are directed to other systems, methods, vehicles, apparatuses, tangible non-transitory computer-readable media, and devices for operating a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
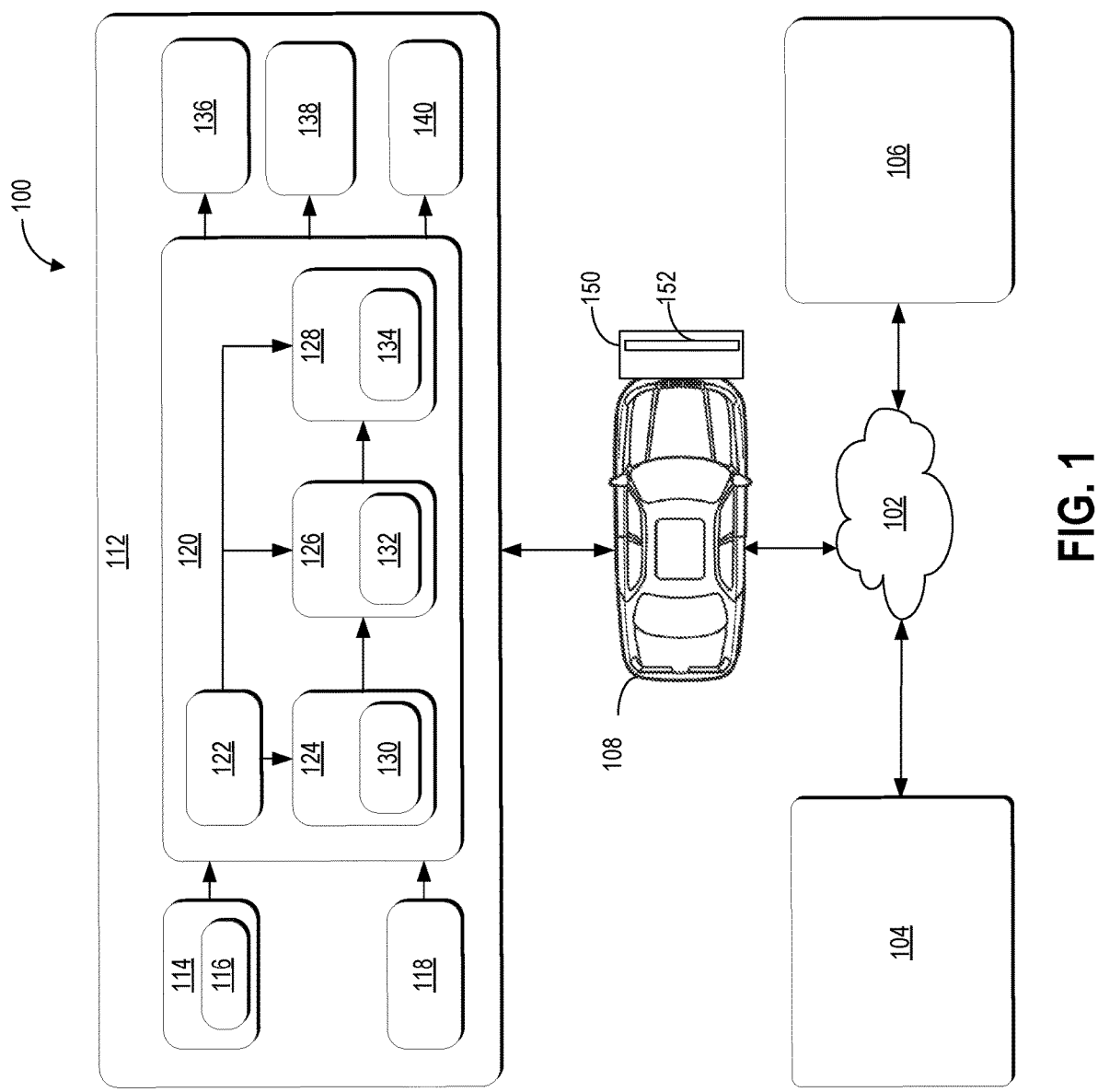
FIG. 1 depicts a diagram of an example system according to example embodiments of the present disclosure.

Example aspects of the present disclosure are directed to a receptacle for a vehicle including an autonomous vehicle, a semi-autonomous vehicle, or a manually operated vehicle, that can perform various functions and/or operations including accommodating various objects including bicycles, scooters, and/or cargo. Further, the disclosed technology can perform one or more operations to more efficiently transport and charge various objects in a transportation network including providing electrical power to a battery of an object. In particular, aspects of the present disclosure include a device that can determine the state of a receptacle of a vehicle; receive object data that includes information associated with accommodating objects in the receptacle; use the object data and the state of the receptacle to determine operations associated with the receptacle; and generate control signals to perform the operations associated with the receptacle including sending one or more control signals to unlock objects in the receptacle.

By way of example, a computing system (e.g., a computing system including one or more computing devices configured to control various vehicle devices associated with a vehicle) associated with a receptacle (e.g., a retractable tray that can be used to carry objects) of a vehicle can receive object data from an electric bicycle via one or more wireless signals. The electric bicycle can be operated by a user wishing to load the electric bicycle onto the receptacle and the object data can include an access code to request the extension of the receptacle from inside the front of the vehicle. The computing system can then perform operations associated with determining the state of the receptacle (e.g., occupied, vacant, or charging), and after determining that the receptacle is vacant (e.g., not carrying any objects), generate control signals to activate motors of the vehicle to extend the receptacle and receive the electric bicycle. When the electric bicycle is placed in the receptacle, a charging port of the electric bicycle can contact a charging outlet of the receptacle (e.g., a plug-in charger, a conductive charging panel, an induction charger, or other charging outlet), thereby charging the electric bicycle when the electric bicycle is in the receptacle. Accordingly, the disclosed technology allows for an improvement in the efficiency with which various types of objects (e.g., bicycles, electric bicycles, and/or cargo) can be transported through a transportation network and charged in transit.

The disclosed technology can include a receptacle system associated with a computing system (e.g., one or more computing devices that includes one or more processors and a memory) that can process, generate, and/or exchange (e.g., send and/or receive) signals or data, including signals or data exchanged with various devices including one or more vehicles, vehicle components (e.g., a receptacle device, a motor, brakes, a steering device, and/or a transmission device), and/or remote computing devices (e.g., one or more vehicles, bicycles, smart phones, laptop computing devices, tablet computing devices, and/or wearable devices).

For example, the receptacle system can be associated with a computing system that can exchange one or more signals (e.g., electronic signals) and/or data with one or more vehicle systems including a receptacle device (e.g., a retractable receptacle that can be used to carry various objects including bicycles, electric bicycles, scooters, and/or cargo), vehicle access systems (e.g., one or more locking mechanisms associated with the receptacle device); illumination systems (e.g., headlights, internal lights, signal lights, and/or tail lights); sensor systems that can generate output based on the state of the vehicle and/or the physical environment external to the vehicle and which can include one or more LIDAR devices, cameras, tactile sensors, microphones, radar devices, and/or sonar devices; communication systems (e.g., wired or wireless communication systems that can exchange signals or data with other devices including various vehicles); navigation systems (e.g., devices that can receive signals from GPS, GLONASS, or other systems used to determine a vehicle's geographical location); notification systems (e.g., devices used to provide notifications including one or more display devices, status indicator lights, and/or audio output systems); braking systems (e.g., brakes of the vehicle including mechanical and/or electric brakes); propulsion systems (e.g., motors and/or engines including internal combustion engines or electric engines); steering systems used to change the trajectory, path, course, or direction of travel of the vehicle; and/or other systems of the vehicle.

The receptacle system can determine one or more states of a receptacle (e.g., a receptacle associated with a vehicle). The one or more states of the receptacle can be associated with accommodation of one or more objects by the receptacle. The receptacle can include one or more devices (e.g., trays, platforms, shelves, and/or racks) that can be used to carry and/or contain one or more objects including bicycles, electric bicycles, and/or cargo (e.g., food crates). By way of further example, the receptacle system can use one or more sensors (e.g., pressure sensors, capacitive sensors, and/or optical sensors) in the receptacle to determine when one or more portions of the receptacle are occupied, vacant, and/or charging an object positioned within a charging portion of the receptacle.

In some embodiments, the receptacle can be retractable into the vehicle and/or extendable from the vehicle. The receptacle system can use one or more motors to retract and/or extend the receptacle into some portion of the vehicle. By way of example, the receptacle system can retract the receptacle into, or extend the receptacle from, a front portion of the vehicle, a rear portion of the vehicle, a side portion of the vehicle, underneath the vehicle, or on top of the vehicle.

In some embodiments, the receptacle can include one or more portions associated with accommodating one or more particular types of the one or more objects. For example, one or more portions of the receptacle can be different sizes and/or shapes to accommodate various types of objects. By way of further example, the one or more portions of the receptacle can include one or more portions (e.g., electrical outlets, conductive charging panels, induction chargers, which can be used to charge electric bicycles) that can provide electrical power that can be used to charge various objects.

In some embodiments, the one or more objects can include one or more bicycles, one or more electric bicycles, one or more scooters, and/or cargo (e.g., loose cargo contained in container portions of the receptacle and/or cargo in its own container).

In some embodiments, the receptacle can include one or more ramps, which can be located at various locations of the receptacle including being located at one or more distal portions of the receptacle. For example, the receptacle can include a ramp that allows objects with wheels (e.g., bicycles) to be rolled onto the receptacle from the ground adjacent to the receptacle.

In some embodiments, the one or more states of the receptacle can include one or more of an available state, a vacant state, or a charging state. For example, in some implementations, the receptacle can include one or more display devices with lighting elements that can generate different colors based on the state of the receptacle (e.g., green when available, red when unavailable, and/or blue when charging a device that is in the receptacle).

In some embodiments, the receptacle can include one or more indicators that can be configured to indicate one or more states of the receptacle. Further, each of the one or more states of the receptacle can be indicated by text, one or more symbols, or one or more colors. For example, in some implementations, the receptacle can include one or more display devices that display the word "AVAILABLE" when the receptacle is available or "UNAVAILABLE" when the receptacle is unavailable. By way of further example, in some implementations, the receptacle can include one or more display devices that display a check mark when the receptacle is available or an "X" when the receptacle is unavailable. Further, different portions of the receptacle can be used to indicate different states. For example, the receptacle can include four sections of which one occupied section is indicated by a red light and three unoccupied sections are indicated by green lights.

The receptacle system can receive object data including information associated with accommodation of the one or more objects by the receptacle. For example, the object data can include information associated with a request to place the one or more objects in the receptacle, including a request received from a user via the user's personal device (e.g., smartphone).

In some embodiments, the object data can include information associated with one or more physical dimensions of each of the one or more objects, a type of each of the one or more objects, a user associated with each of the one or more objects, or a mass of each of the one or more objects. For example, the object data from an electric bicycle can include an indication that the object is an electric bicycle, the physical dimensions of the electric bicycle, an anonymized user identifier (e.g., an identifier without personally identifying information) used to associate an object with a user, and the mass of the electric bicycle.

In some embodiments, the object data can include information associated with authorization to access the receptacle. For example, the object data can include one or more access codes that can be transmitted wirelessly from an object (e.g., transmitted from an electrical bicycle) to the receptacle system. In this way, access to each of the one or more objects can be restricted based on possession of the one or more access codes.

The receptacle system can determine one or more operations associated with the receptacle based at least in part on the object data and the one or more states of the receptacle. For example, the receptacle system can use the object data and the one or more states of the receptacle to determine one or more operations associated with the receptacle including granting access to one or more portions of the receptacle, charging a device in the receptacle, locking a device in the receptacle, unlocking a device in the receptacle, extending the receptacle from the vehicle, retracting the receptacle into the vehicle, or other operation.

The receptacle system can generate one or more control signals to perform the one or more operations associated with the receptacle. For example, the receptacle system can generate one or more control signals including electronic signals and/or data associated with performing the one or more operations. Further, the one or more control signals can include signals that are encoded with data that includes instructions for the receptacle (e.g., instructions to generate one or more indications on the receptacle, control movement of the receptacle, and/or provide access to one or more portions of the receptacle). In some embodiments, the one or more control signals can be transmitted via a wired interconnection or wirelessly including for example, via an antenna.

In some embodiments, determining one or more operations associated with the receptacle based at least in part on the object data and the one or more states of the receptacle can include determining that access to the receptacle is authorized based at least in part on the object data satisfying one or more access criteria. For example, the object data can include an object identifier that is sent from an object to the receptacle system when the object is within a predetermined proximity distance. The receptacle system can then perform one or more operations upon receiving the object data including the object identifier. Furthermore, the one or more operations associated with the receptacle can include providing the one or more objects with access to the receptacle (e.g., unlocking an object that is in the receptacle).

In some embodiments, satisfying the one or more access criteria can include the object data including one or more object access codes that match one or more receptacle access codes associated with providing access to the receptacle or the receptacle having sufficient space to accommodate the one or more objects. For example, the receptacle system can compare the one or more object access codes to one or more receptacle access codes associated with validating an object for accommodation on the receptacle and providing access to the receptacle. Based on the comparison of the one or more object access codes to the one or more receptacle access codes, the receptacle system can determine when a match has occurred between the one or more object access codes and the one or more receptacle access codes.

In some embodiments, determining one or more operations associated with the receptacle based at least in part on the object data and the one or more states of the receptacle can include determining when at least one object of the one or more objects is rechargeable and positioned in a recharging portion of the receptacle (e.g., in contact with a recharging portion of the receptacle, positioned in a particular location with respect to a recharging portion of the receptacle, or within a predetermined distance of a recharging portion of the receptacle). For example, the receptacle system can include one or more sensors that can detect when a portion of an object (e.g., an object identified as being rechargeable by the receptacle system based at least in part on an object identifier included in the object data) is positioned in a recharging portion (e.g., plugged into a plug-in charger, contacting a conductive charging panel, or positioned adjacent to an induction charger) of the receptacle.

Furthermore, the one or more operations can include recharging the at least one object when the at least one object is rechargeable and positioned within the recharging portion of the receptacle. For example, the receptacle system can supply electrical power to the object when one or more sensors of the receptacle system detect that the object is in contact with the recharging portion of the receptacle.

In some embodiments, recharging the at least one object includes recharging the at least one object via one or more solar power sources of the vehicle. For example, the receptacle system can include one or more solar panels on the top of the vehicle that are used to charge batteries that can provide electricity for the receptacle system to use in charging an object.

In some embodiments, the receptacle system can extend the receptacle from the vehicle when the vehicle is stationary and the object data is received. For example, the receptacle system can determine, based at least in part on sensors in the receptacle system (e.g., motion sensors including accelerometers) that the vehicle is stationary and can, in response to receiving object data including a request to place an object in the receptacle, extend the receptacle from inside the vehicle.

In some embodiments, the receptacle system can retract the receptacle into the vehicle when vehicle is stationary and the receptacle is empty. For example, the receptacle system can determine, based at least in part on weight and/or pressure sensors in the receptacle system (e.g., a weight sensor, pressure sensors, and/or motion sensors including accelerometers) that the vehicle is empty. Further, the receptacle system can determine, based at least in part on sensors in the receptacle system (e.g., motion sensors including accelerometers) that the vehicle is stationary and can, in response to determining that the receptacle is stationary and empty, retract the receptacle into the vehicle.

In some embodiments, the receptacle system can secure (e.g., fix in place, fasten, and/or attach) the one or more objects to the receptacle when the one or more objects are in the receptacle based at least in part on the one or more control signals. For example, the receptacle system can include one or more mechanisms that can, in response to receiving one or more control signals, hold the one or more objects securely in place when the one or more objects are in the receptacle.

In some embodiments, securing the one or more objects can include grasping the one or more objects in one or more grasping members of the receptacle or magnetically coupling one or more magnetic portions of the one or more objects to the receptacle, including via one or more electromagnets, ferromagnetic magnets, or other types of magnets. For example, when an object (e.g., an electric bicycle) is placed in the receptacle, a securing mechanism can come down over the object to secure it in the receptacle.

In some embodiments, the receptacle system can cover a portion of the one or more objects when the one or more objects are in the receptacle based at least in part on the one or more control signals. For example, when one or more objects are placed in the receptacle, the receptacle system can generate one or more control signals that can be used to activate motors that can cover some part of the one or more objects with a covering element (e.g., a metal, plastic, glass, and/or fabric covering) that can be part of the receptacle system.

In some embodiments, the receptacle system can receive one or more requests for the one or more states of the receptacle from one or more remote devices (e.g., one or more user devices including smart phones). For example, the receptacle system can receive, via a wireless network, request data including information associated with one or more requests for the location (e.g., geographic location) and availability (e.g., how much of the receptacle is available) from one or more devices (e.g., smart phones) belonging to users wishing to place an object (e.g., a bicycle) on a receptacle.

Further, the receptacle system can send receptacle data including information associated with the one or more states of the receptacle to the one or more devices. The one or more states of the receptacle can include a location of the receptacle and/or an availability of the receptacle. For example, in response to a request for an available receptacle, the receptacle system can provide a response indicating that the receptacle is at a location one hundred meters away from the requesting device and that the receptacle has three spaces for electric bicycles available.

The systems, methods, devices, and non-transitory computer-readable media in the disclosed technology can provide a variety of technical effects and benefits to the overall operation of a vehicle including more effective transportation of objects through a transportation network (e.g., a system of roads through which vehicular and/or foot traffic can travel).

For example, the disclosed technology can better exploit transportation efficiencies that can result from the quick and convenient transition from one mode of transportation (e.g., riding a bicycle) to another form of transportation (e.g., riding a vehicle with the bicycle secured in a receptacle of the vehicle) and back to the initial mode of transportation (e.g., removing the bicycle from the receptacle and riding it after the vehicle arrives at a destination). As such, the disclosed technology allows for transit that uses different forms of transportation in a seamless fashion with minimal disruption.

The disclosed technology can also utilize energy resources more efficiently by providing an effective way to charge one or more objects (e.g., electric bicycles) as the objects are being transported. In this way, the down-time resulting from objects that have depleted batteries can be reduced since the receptacle system can recharge objects when the objects are not in use. Further, the use of solar panels in the disclosed technology can provide a more environmentally friendly way to charge objects that are being transported. For example, larger solar panels on the receptacle system can provide a greater amount of energy in a more efficient manner than smaller solar panels on the individual objects being transported (e.g., solar panels on an electric bicycle or electric scooter).

Further, the disclosed technology can realize the benefits of improved fuel efficiency by providing a receptacle system that allows users to switch from higher resource usage forms of transportation (e.g., a bus) to lower resource usage forms of transportation (e.g., an electric bicycle) to minimum resource usage forms of transportation (e.g., foot travel). By providing a way to easily switch between different forms of transportation, the disclosed technology allows for greater flexibility of travel and the ability to use lower resource usage forms of transportation as needed.

Additionally, the disclosed technology can improve operational safety by providing an effective way to conveniently store and secure one or more objects including bicycles, electric bicycles, and/or various types of cargo. For example, in contrast with carrying objects (e.g., scooters) inside a vehicle, where those objects can move with the motion of the vehicle and potentially contact passengers or damage the inside of the vehicle, the receptacle system provides a way to securely store objects in a receptacle that is easily accessible and allows passengers to enjoy greater comfort inside the vehicle. The disclosed technology can also improve safety by facilitating the transportation of one or more objects (e.g., electric bicycles) on the receptacle system through less favorable environments (e.g., areas with high vehicle traffic) and allowing the user of the one or more objects to rapidly remove and use the one or more objects when the environment is more amenable.

Accordingly, the disclosed technology provides a more effective way to transport and/or charge one or more objects through improvements in transportation network efficiency, safety gained through securing objects in a receptacle, and resource efficiency by way of charging devices as the devices are transported.

Various means can be configured to perform the methods and processes described herein. For example, a computing system can include one or more receptacle state determination units, one or more object data receiving units, one or more operation determination units, one or more control signal generation units, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a receptacle system) or configured (e.g., an ASIC custom designed and configured to operate a receptacle system) to perform one or more algorithms for performing the operations and functions described herein. For example, the means can be configured to determine one or more states of a receptacle of a vehicle in which the one or more states of the receptacle are associated with accommodation of one or more objects by the receptacle. In some implementations, the means can be configured to determine when the receptacle is in an available state, a vacant state, or a charging state. A receptacle state determination unit is an example of a means for determining such data as described herein.

Furthermore, the means can be configured to receive object data including information associated with accommodation of one or more objects by the receptacle. In some implementations, the means can be configured to receive object data associated with authorization to access the receptacle (e.g., object data including one or more object access codes). Further, in some implementations, the means can be configured to receive object data that includes information associated with one or more physical dimensions of each of the one or more objects, a type of each of the one or more objects, a user associated with each of the one or more objects, or a mass of each of the one or more objects. An object data receiving unit is an example of a means for receiving such data as described herein.

Furthermore, the means can be configured to determine one or more operations associated with the receptacle based at least in part on the object data and the one or more states of the receptacle. In some implementations, the means can be configured to determine, based at least in part on the object data satisfying one or more access criteria, that access to the receptacle is authorized. Further, in some implementations, the means can be configured to determine when at least one object of the one or more objects is rechargeable and in contact with a recharging portion of the receptacle. An operation determination unit is an example of a means for determining such data as described herein.

Furthermore, the means can be configured to generate one or more control signals to perform the one or more operations associated with the receptacle. In some implementations, the means can be configured to extend and/or retract a receptacle respectively from and into a vehicle associated with a receptacle system. Further, in some implementations the means can be configured to secure and/or cover one or more objects in a receptacle of a receptacle system. Furthermore, in some implementations the means can be configured to receive one or more requests for the one or more states of the receptacle from one or more devices; and send receptacle data including information associated with the one or more states of the receptacle to the one or more devices. A control signal generation unit is an example of a means for determining such data as described herein.

With reference now to FIGS. 1-13, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; and a receptacle 150.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and/or functions associated with operation of a vehicle including determining one or more states of a receptacle (e.g., the receptacle 150 with one or more states that can be determined by the one or more sensors 114) of a vehicle (e.g., the vehicle 108), in which the one or more states of the receptacle can be associated with accommodation of one or more objects by the receptacle; receiving object data including information associated with accommodation of the one or more objects (e.g., any type of object including bicycles, electric bicycles, and/or cargo) by the receptacle; determining one or more operations associated with the receptacle based at least in part on the object data and the one or more states of the receptacle; and generating one or more control signals to perform the one or more operations associated with the receptacle (e.g., moving and/or maneuvering the receptacle 150).

For example, the operations computing system 104 can be configured to monitor and communicate with the vehicle 108 and/or its users to coordinate a vehicle service provided by the vehicle 108. To do so, the operations computing system 104 can manage a database that includes data including vehicle status data associated with the status of vehicles including the vehicle 108; and/or passenger status data associated with the status of passengers of the vehicle. The vehicle status data can include a location of a vehicle (e.g., a latitude and longitude of a vehicle), the availability of a vehicle (e.g., whether a vehicle is available to pick-up or drop-off passengers and/or cargo), the state of a receptacle of the vehicle (e.g., the state of the receptacle 150), or the state of objects external to a vehicle (e.g., the physical dimensions and/or appearance of objects external to the vehicle). The passenger status data can include one or more states of passengers of the vehicle including one or more locations of one or more passengers.

The operations computing system 104 can communicate with the one or more remote computing devices 106 and/or the vehicle 108 via one or more communications networks including the communications network 102. The communications network 102 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including exchanging (e.g., sending and/or receiving) data or signals with the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 via the communications network 102. Furthermore, in some embodiments, the one or more remote computing devices can perform one or more operations (e.g., remotely performing one or more operations on the vehicle 108 via the communications network 102) including determining one or more states of a receptacle (e.g., the receptacle 150 which can have states that can be determined by the one or more sensors 114) of a vehicle (e.g., the vehicle 108), in which the one or more states of the receptacle can be associated with accommodation of one or more objects by the receptacle; receiving object data including information associated with accommodation of the one or more objects (e.g., any type of object including bicycles, electric bicycles, and/or cargo) by the receptacle; determining one or more operations associated with the receptacle based at least in part on the object data and the one or more states of the receptacle; and generating one or more control signals to perform the one or more operations associated with the receptacle (e.g., moving and/or maneuvering the receptacle 150).

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 and/or the receptacle 150 including a location (e.g., a latitude and longitude), a velocity, an acceleration, a trajectory, and/or a path of the vehicle 108 and/or the receptacle 150 based in part on signals or data exchanged with the vehicle 108 and/or the receptacle 150. In some implementations, the operations computing system 104 can include the one or more remote computing devices 106.

The vehicle 108 can be a ground-based vehicle (e.g., an automobile), an aircraft, and/or another type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions and/or appearance of the one or more objects) can be stored locally in one or more memory devices of the vehicle 108. Furthermore, the vehicle 108 can provide data indicative of the state of the one or more objects (e.g., physical dimensions and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for determining one or more states of a receptacle (e.g., the receptacle 150 which can have states that can be determined by the one or more sensors 114) of a vehicle (e.g., the vehicle 108), in which the one or more states of the receptacle can be associated with accommodation of one or more objects by the receptacle; receiving object data including information associated with accommodation of the one or more objects (e.g., any type of object including bicycles, electric bicycles, and/or cargo) by the receptacle; determining one or more operations associated with the receptacle based at least in part on the object data and the one or more states of the receptacle; and generating one or more control signals to perform the one or more operations associated with the receptacle (e.g., moving and/or maneuvering the receptacle 150).

In some embodiments, the object data received by the vehicle computing system 112 can include information associated with one or more physical dimensions of each of the one or more objects, a type of each of the one or more objects, a user associated with each of the one or more objects, and/or a mass of each of the one or more objects.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LIDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LIDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that can be used to guide the vehicle 108 to a location at which the receptacle 150 can be loaded with one or more objects. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the systems on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on or within the vehicle 108. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces 140 to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to activate motors in the vehicle 108 to move the receptacle 150 (e.g., retract the receptacle 150 or extend the receptacle 150) and/or determine the state of the receptacle 150 (e.g., determine when the receptacle 150 is vacant, available, and/or charging an object).

By way of further example, the vehicle computing system 112 can activate one or more vehicle systems including the receptacle 150 (e.g., sending one or more control signals to retract the receptacle into the vehicle 108, extend the receptacle from the vehicle 108, determine the state of the receptacle and/or one or more objects in the receptacle, and/or charge one or more objects in the receptacle); the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle; and/or steering systems that can change the path, course, and/or direction of travel of the vehicle 108.

The vehicle 108 can include and/or be associated with the receptacle 150 which can include one or more devices configured to carry, transport, secure, charge (e.g., supply electrical power to an object via an outlet of the receptacle 150), and/or cover one or more objects that can be placed and/or positioned in or on the receptacle 150. The receptacle 150 can receive one or more signals from the vehicle computing system 112. The one or more signals received from the vehicle computing system 112 can be used to activate one or more motors of the receptacle 150 that can be used to move the receptacle 150 including retracting some portion of the receptacle 150 inside the vehicle 108, extending some portion of the receptacle 150 from the vehicle 108, positioning some portion of the receptacle 150 with respect to the vehicle 110 and/or a ground surface (e.g., raising and/or lowering the receptacle 150), and/or folding or collapsing some portion of the receptacle 150. Further, the receptacle 150 can include one or more receptacle apertures 152 that can be used to perform one or more functions and/or operations including securing, and/or charging objects that are placed in the receptacle 150. The receptacle 150 can be positioned on any portion of the vehicle 108 including in the front portion of the vehicle 108, the rear portion of the vehicle 108, the left or right portion of the vehicle 108, on the bottom portion of the vehicle 108, and/or on the top portion (e.g., the roof) of the vehicle 108. The receptacle 150 can also be configured to be detachable from the vehicle 108.

In some embodiments, the receptacle 150 can include one or more ramps that can be located at one or more distal portions of the receptacle 150 (e.g., a receptacle positioned at the front of the vehicle 108 can include ramps that slope upwards from the outside edge of the receptacle near the wheels of the vehicle 108 towards the opposite wheel of the vehicle 108).

In some embodiments, one or more states of the receptacle 150 can include one or more of an available state (e.g., a state in which the receptacle 150 is available to carry one or more objects), a vacant state (e.g., a state in which the receptacle 150 is empty), and/or a charging state (e.g., a state in which the receptacle 150 is charging one or more objects).

In some embodiments, the receptacle 150 can include one or more indicators configured to indicate the one or more states of the receptacle. Further, each of the one or more states of the receptacle can be indicated by text, one or more symbols, and/or one or more colors.

Figure 2:
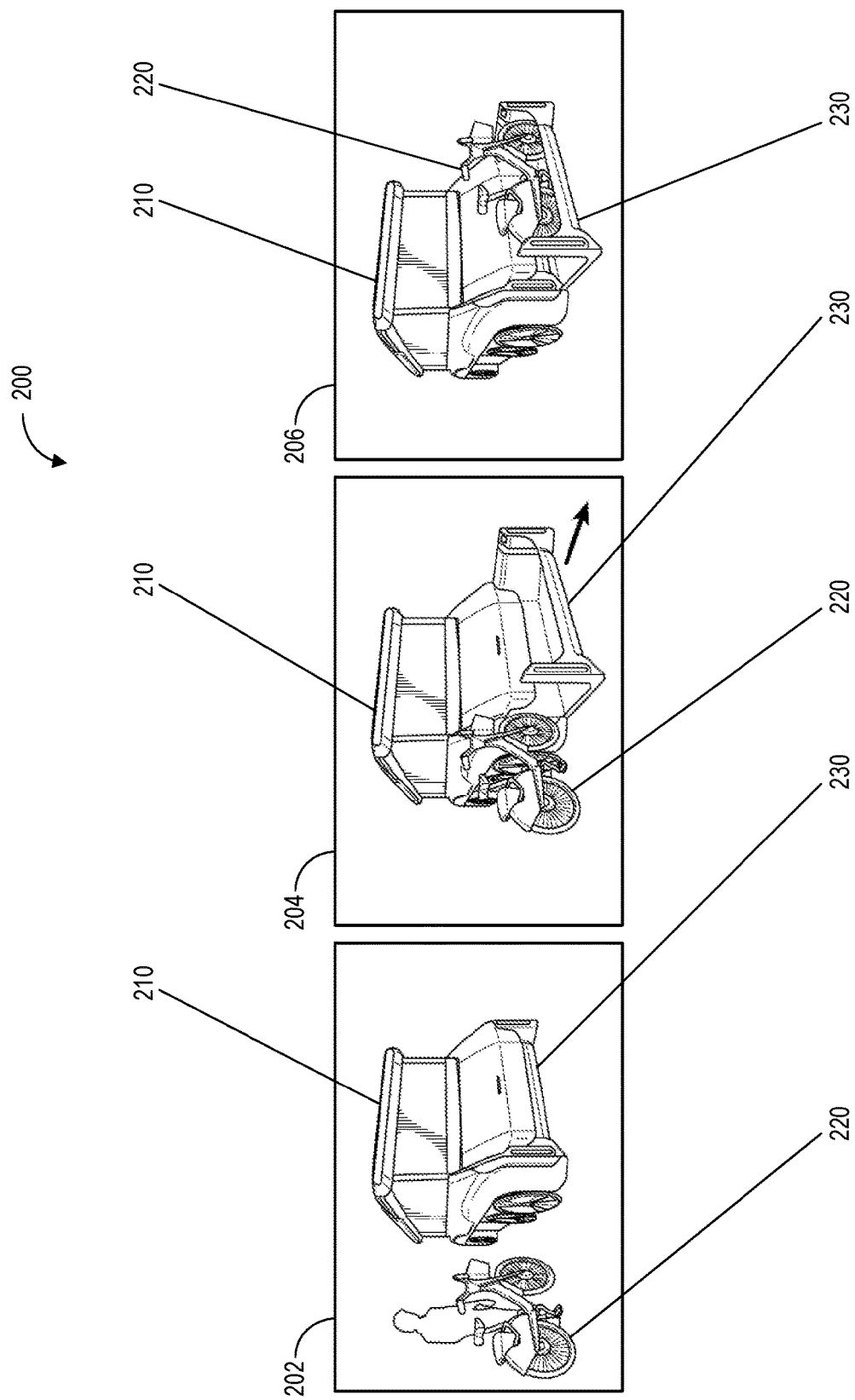
FIG. 2 depicts an example of a receptacle system according to example embodiments of the present disclosure.

FIG. 2 depicts an example of a receptacle system according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows a sequence of events 200 including a time interval 202 (e.g., a first time interval), a time interval 204 (e.g., a second time interval subsequent to the time interval 202), a time interval 206 (e.g., a third time interval subsequent to the time interval 204), a vehicle 210 (e.g., an autonomous vehicle), an object 220 (e.g., an electric bicycle), and a receptacle 230 (e.g., a receptacle that is retracted into the vehicle 210).

At the time interval 202, the object 220 is positioned next to the vehicle 210 which is stationary and includes the receptacle 230. The receptacle 230 is in a retracted position within the body of the vehicle 210. In this example, the receptacle 230 includes one or more sensors that can detect the presence of the object 220 when the object 220 is brought within a sensor proximity distance (e.g., a distance of five meters from the receptacle 230). Further, the receptacle 230 can receive one or more signals or data (e.g., receive via a wireless transmission from the object 220. The one or more signals or data received by the receptacle 230 from the object 220 can be used to make the receptacle 230 perform one or more operations including retracting the receptacle from the vehicle 210, extending the receptacle from the vehicle 210, and/or charging the object 220. The receptacle 230 can also receive one or more user inputs (e.g., user inputs to one or more input devices of the receptacle 230 including a touch pad, a keyboard, one or more buttons, and/or one or more levers). The one or more user inputs (e.g., a user pressing a button on the receptacle) can be used to send one or more signals or data to the receptacle 230 so that the receptacle 230 will perform one or more actions (e.g., retracting the receptacle 230 from the vehicle 210, extending the receptacle 230 from the vehicle 210, and/or charging the object 220).

At the time interval 204, the object 220 is moving towards the vehicle 210 which is stationary and includes the receptacle 230. The receptacle 230 is in an extended position in front of the vehicle 210. In this example, the receptacle 230 has extended from the lower front portion of the vehicle 210 via motors of the receptacle 230. In this example, the receptacle 230 extended after one or more sensors of the receptacle 230 detected the presence of the object 220 which is within the sensor proximity distance (e.g., a distance of five meters from the receptacle 230) of the receptacle 230.

At the time interval 206, the object 220 is positioned on the receptacle 230. The receptacle 230 is in an extended position in front of the vehicle 210. In this example, the receptacle 230 includes one or more sensors that detect the presence of the object 220 when the object 220 is on the receptacle 230. The receptacle 230 can secure the object 220 inside the receptacle 230 using one or more magnets and/or one or more mechanical locks (not shown). Further, the receptacle 230 includes a charging portion (not shown) that can charge the object 220 when the object 220 is on the receptacle 230.

In some embodiments, any of the vehicle 210, the vehicle 210, and/or the vehicle 210 can perform one or more operations including determining one or more states of a receptacle (e.g., the receptacle 230) of a vehicle (e.g., the vehicle 210). The one or more states of the receptacle can be associated with accommodation of one or more objects (e.g., the object 220) by the receptacle. The operations can also include receiving object data including information associated with accommodation of the one or more objects by the receptacle. The operations can include determining one or more operations associated with the receptacle based at least in part on the object data and the one or more states of the receptacle. Furthermore, the operations can include generating one or more control signals to perform the one or more operations associated with the receptacle (e.g., moving the receptacle to the different retracted, extended, and loaded states shown in the time interval 202/204/206).

Figure 3:
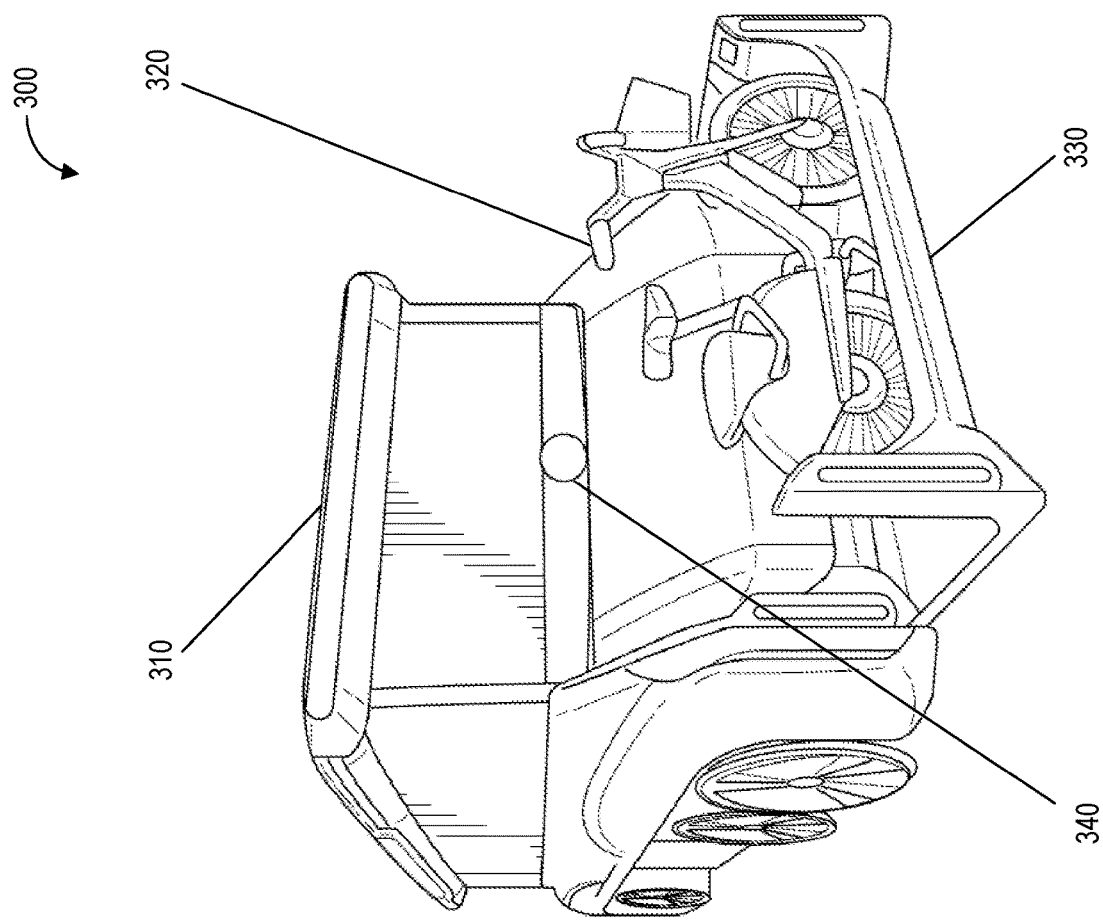
FIG. 3 depicts an example of a receptacle system according to example embodiments of the present disclosure.

FIG. 3 depicts an example of a receptacle system according to example embodiments of the present disclosure. One or more operations and/or functions or operations in FIG. 3 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows a receptacle system 300 including a vehicle 310 (e.g., an autonomous vehicle), an object 320 (e.g., an electric bicycle), a receptacle 330 (e.g., a receptacle that is extended from the vehicle 310 and carrying the object 320), an indicator 340 (e.g., a lighting element that emits a red light to indicate that the object 320 will receptacle 330 is occupied).

In this example, the object 320 is positioned on the receptacle 330. The receptacle 330 is in an extended position in front of the vehicle 310 and is carrying the object 320. The receptacle 330 includes one or more sensors that can detect the presence of the object 320 in the receptacle 330. Further, the receptacle 330 is associated with the indicator 340 that can indicate the state of the receptacle 330. The indicator 340 can indicate, for example, when an object (e.g., the object 320) is currently occupying or will occupy the receptacle 330 (e.g., a passenger of the vehicle 310 will place the object 320 within the receptacle 330 and remove the object 320 when the passenger leaves the vehicle 310); when the receptacle 330 is vacant (e.g., no object 320 is currently occupying the receptacle 330); and when an object 320 in the receptacle is being charged (e.g., the object 320 is being charged via one or more electrical outlets of the receptacle 330).

In some embodiments, the indicator 340 can produce various indications including different colors (e.g., a green light to indicate a vacant state, a red light to indicate an occupied state, and/or a blue light to indicate a charging state), blinking lights (e.g., blinking LEDs), and/or audible indications (e.g., chimes, beeping, and/or one or more announcements).

In some embodiments, any of the vehicle 310 can perform one or more operations including determining one or more states of a receptacle (e.g., the receptacle 330) of a vehicle (e.g., the vehicle 310). The one or more states of the receptacle can be associated with accommodation of one or more objects (e.g., the object 320) by the receptacle. The operations can also include receiving object data including information associated with accommodation of the one or more objects by the receptacle. The operations can include determining one or more operations associated with the receptacle based at least in part on the object data and the one or more states of the receptacle. Furthermore, the operations can include generating one or more control signals to perform the one or more operations associated with the receptacle (e.g., moving the receptacle to the different retracted, extended, and loaded states.

Figure 4:
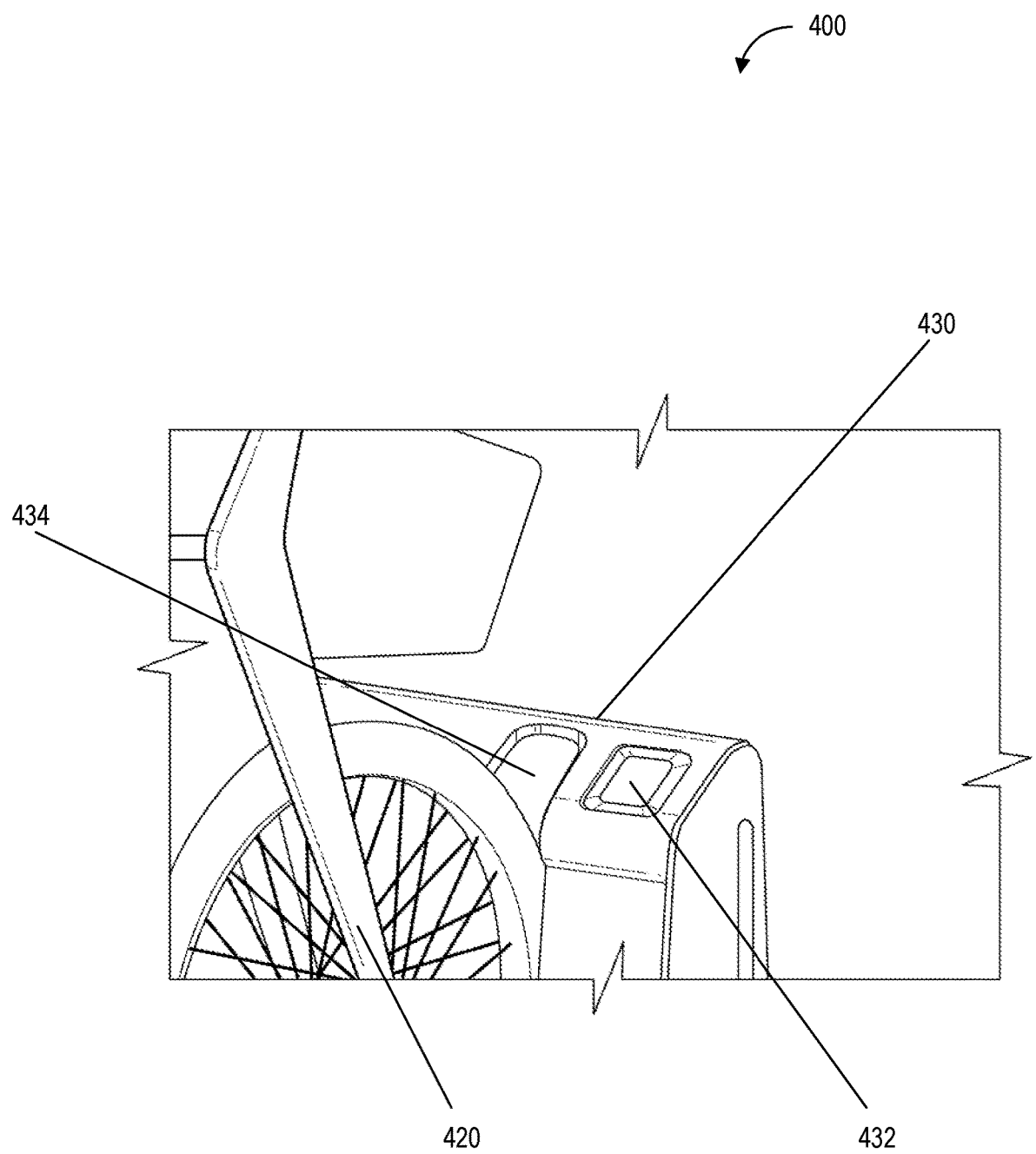
FIG. 4 depicts an example of a receptacle system according to example embodiments of the present disclosure.

FIG. 4 depicts an example of a receptacle system according to example embodiments of the present disclosure. One or more operations and/or functions in FIG. 4 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 4 can include one or more features of one or more devices and/or systems including, for example, the operations computing system 104, the vehicle 108, or the vehicle computing system 112, which are depicted in FIG. 1.

As illustrated, FIG. 4 shows a receptacle system 400 including an object 420 (e.g., a bicycle), a receptacle 430, a security device 432 (e.g., a scanning device that can process QR codes), and a receptacle aperture 434 (e.g., an aperture in the receptacle 430 that can receive an object, detect an object, and/or charge an object).

In this example, the receptacle 430 is carrying the object 420 which is secured (e.g., held in place and/or locked in place) in the receptacle aperture 434 of the receptacle 430. The receptacle aperture 434 can include a lock (e.g., a mechanism that grasps a portion of the object 420 and/or a magnet that uses magnetic attraction to secure the object 420) that can secure an object (e.g., the object 420) that is in the receptacle aperture 434. The receptacle 430 includes the security device 432 that can receive various inputs to secure an object or release an object (e.g., the object 420) that is secured in the receptacle 430.

For example, the security device 432 can include a transceiver that can send and/or receive one or more signals that include codes that can be used to access the receptacle 430 and indicate that the receptacle 430 should perform one or more operations including retracting, extending, charging the object 420, securing the object 420, and/or releasing the object 420 that is secured. By way of further example, the security device 432 can include one or more image sensors that can scan an image (e.g., a QR code and/or a bar code) that can be used to access the receptacle 430 and indicate that the receptacle 430 should perform one or more operations including retracting, extending, charging the object 420, securing the object 420, and/or releasing the object 420 that is secured. Furthermore, the security device 432 can be configured to provide a user with access authorization to access an object (e.g., the object 420) that is secured in the receptacle 430. For example, a user can provide user-specific access data associated with the user that can allow the user to access the object 420 and/or indicate that the receptacle 430 should perform one or more operations including retracting, extending, charging the object 420, securing the object 420, and/or releasing the object 420 that is secured.

In some embodiments, the receptacle 430 can perform one or more operations including determining one or more states of a receptacle (e.g., the receptacle 430) of a vehicle (e.g., the vehicle 108 that is depicted in FIG. 1). The one or more states of the receptacle can be associated with accommodation of one or more objects (e.g., the object 420) by the receptacle. The operations can also include receiving object data including information associated with accommodation of the one or more objects by the receptacle. The operations can include determining one or more operations associated with the receptacle based at least in part on the object data and the one or more states of the receptacle. Furthermore, the operations can include generating one or more control signals to perform the one or more operations associated with the receptacle (e.g., determining the state of the receptacle aperture 434, securing an object in the receptacle 430, releasing an object secured in the receptacle 430).

Figure 5:
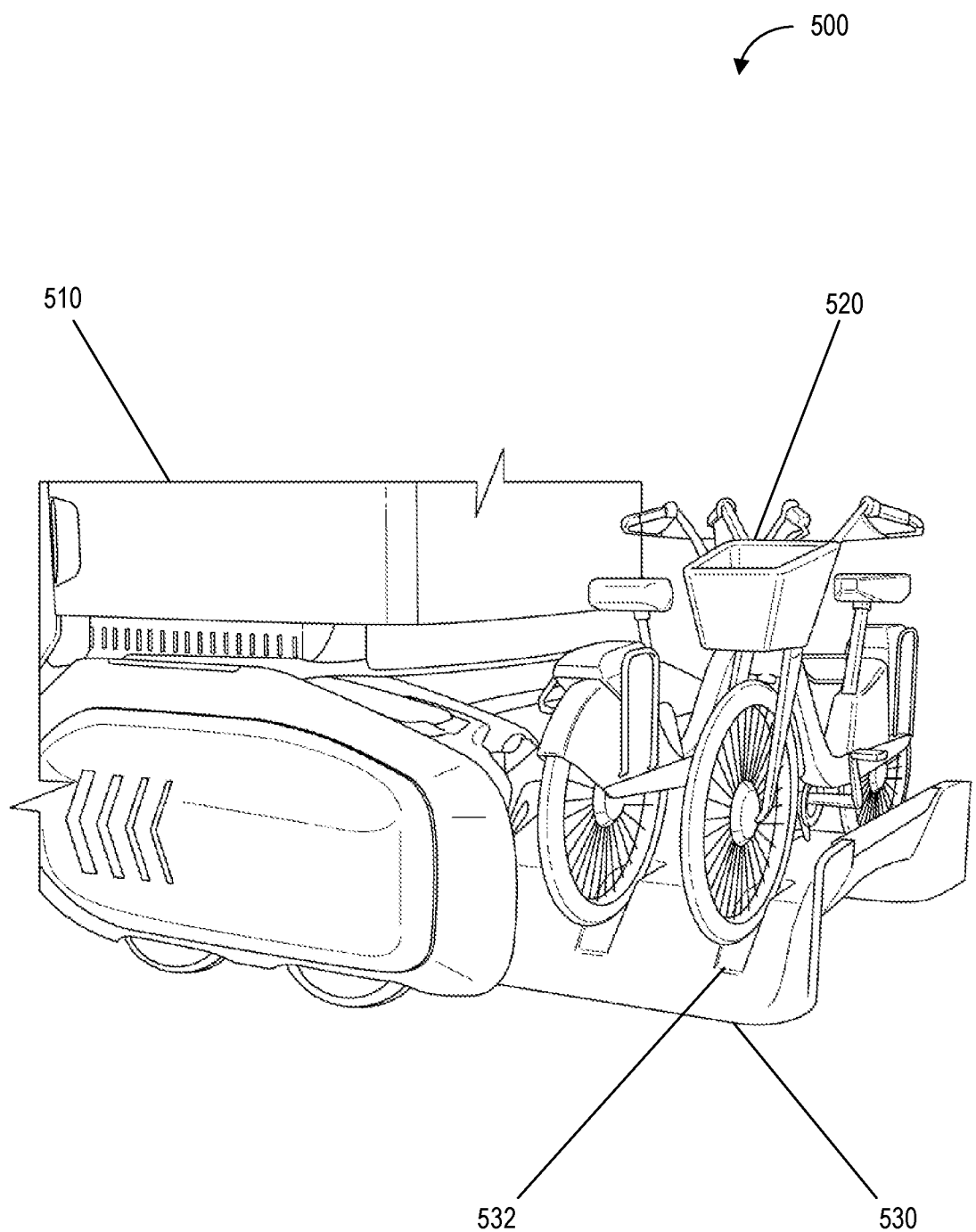
FIG. 5 depicts an example of a receptacle system according to example embodiments of the present disclosure.

FIG. 5 depicts an example of a receptacle system according to example embodiments of the present disclosure. One or more operations and/or functions or operations in FIG. 5 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 5 can include one or more features of one or more devices and/or systems including, for example, the operations computing system 104, the vehicle 108, or the vehicle computing system 112, which are depicted in FIG. 1.

As illustrated, FIG. 5 shows a receptacle system 500 including a vehicle 510 (e.g., an autonomous vehicle), an object 520 (e.g., a bicycle), a receptacle 530, one or more ramps 532 (e.g., a ramp of the receptacle 530), and the receptacle aperture 534.

In this example, the receptacle 530 is carrying the object 520 which is secured (e.g., held in place and/or locked in place) in the receptacle aperture 534 of the receptacle 530. The receptacle aperture 534 can include one or more grooves and/or channels that can assist in holding an object (e.g., the object 520) in place. Further, the receptacle aperture 534 can include one or more channels with a shape that conforms to the shape of an object that is placed in the receptacle aperture 534. For example, the receptacle aperture 534 can include a round shaped channel that can accommodate a circular object (e.g., a wheel), a square shaped channel that can accommodate various cube shaped objects (e.g., boxes), and/or a triangular shaped channel that narrows near a bottom or side portion of the receptacle aperture 534.

Furthermore, the receptacle 530 can include the one or more ramps 532 that can be used to facilitate the loading and/or placement of one or more objects on the receptacle 530. The one or more ramps 532 can be located at any side of the receptacle 530. For example, the one or more ramps 532 can be located at a left, right, front, and/or rear side of the receptacle 530.

In some embodiments, the vehicle 510 can perform one or more operations including determining one or more states of a receptacle (e.g., the receptacle 530) of a vehicle (e.g., the vehicle 510). The one or more states of the receptacle can be associated with accommodation of one or more objects (e.g., the object 520) by the receptacle. The operations can also include receiving object data including information associated with accommodation of the one or more objects by the receptacle. The operations can include determining one or more operations associated with the receptacle based at least in part on the object data and the one or more states of the receptacle. Furthermore, the operations can include generating one or more control signals to perform the one or more operations associated with the receptacle (e.g., determining the state of the receptacle 530).

Figure 6:
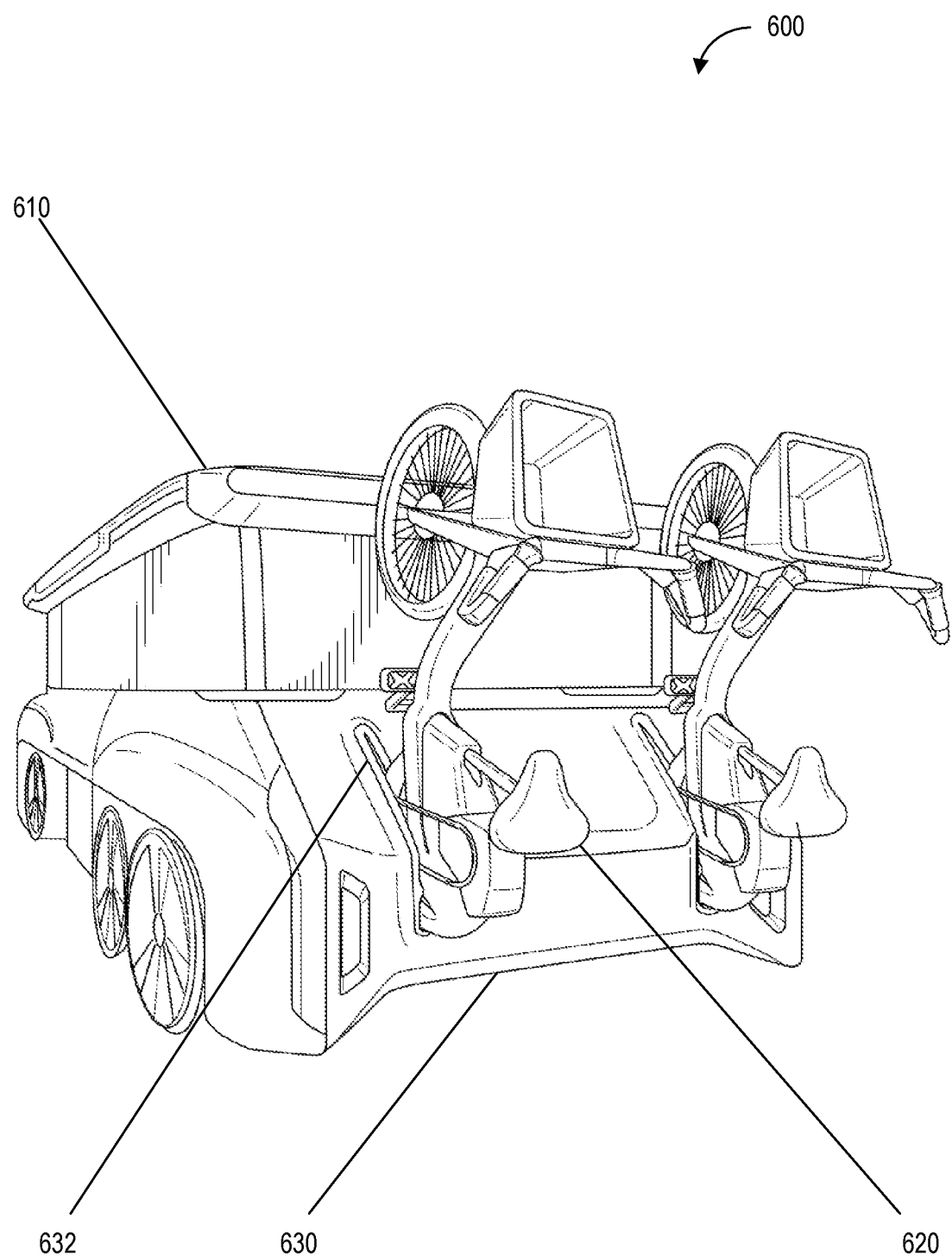
FIG. 6 depicts an example of a receptacle system according to example embodiments of the present disclosure.

FIG. 6 depicts an example of a receptacle system according to example embodiments of the present disclosure. One or more operations and/or functions or operations in FIG. 6 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 6 can include one or more features of one or more devices and/or systems including, for example, the operations computing system 104, the vehicle 108, or the vehicle computing system 112, which are depicted in FIG. 1.

As illustrated, FIG. 6 shows a receptacle system 600 including a vehicle 610 (e.g., an autonomous vehicle), an object 620 (e.g., a bicycle), a receptacle 630, and a receptacle aperture 632 (e.g., an aperture of the receptacle 630 that can hold one or more objects including the object 620).

In this example, the receptacle 630 is carrying the object 620 (e.g., a bicycle) which is secured (e.g., held in place and/or locked in place) in the receptacle aperture 632 of the receptacle 630. The object 620 is held in a vertical position in the receptacle aperture 632 of the receptacle 630. In some embodiments, an object can be manually placed in the receptacle aperture 632. In other embodiments, the receptacle 630 can extend from the vehicle 610 in a first position in which the receptacle aperture 632 is horizontal with respect to the surface of the ground. When an object is placed in the receptacle 630 and the receptacle is retracted into the vehicle 610, the receptacle 630 can move into a second position in which the receptacle aperture is vertical with respect to the surface of the ground as illustrated in FIG. 6. Furthermore, in other embodiments, the receptacle 630 can be configured to carry one or more objects in a different position from when the object was placed in the receptacle 630. For example, the receptacle 630 can include one or more motors that can move the receptacle 630 to different positions.

In some embodiments, the vehicle 610 can perform one or more operations including determining one or more states of a receptacle (e.g., the receptacle 630) of a vehicle (e.g., the vehicle 610). The one or more states of the receptacle can be associated with accommodation of one or more objects (e.g., the object 620) by the receptacle. The operations can also include receiving object data including information associated with accommodation of the one or more objects by the receptacle. The operations can include determining one or more operations associated with the receptacle based at least in part on the object data and the one or more states of the receptacle. Furthermore, the operations can include generating one or more control signals to perform the one or more operations associated with the receptacle (e.g., determining the state of the receptacle 630 and/or the receptacle aperture 632).

Figure 7:
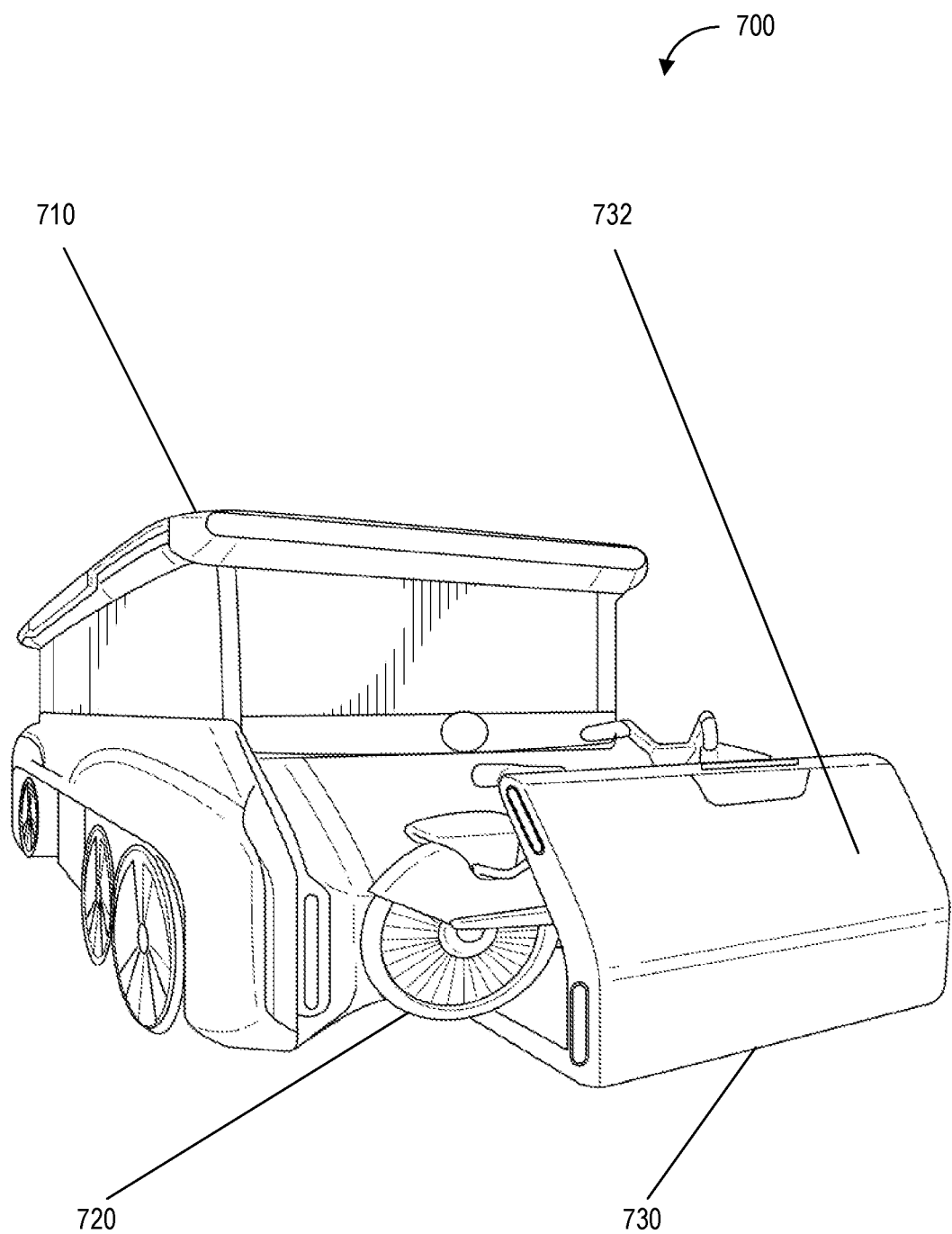
FIG. 7 depicts an example of using a receptacle system according to example embodiments of the present disclosure.

FIG. 7 depicts an example of a receptacle system according to example embodiments of the present disclosure. One or more operations and/or functions or operations in FIG. 7 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 7 can include one or more features of one or more devices and/or systems including, for example, the operations computing system 104, the vehicle 108, or the vehicle computing system 112, which are depicted in FIG. 1.

As illustrated, FIG. 7 shows a receptacle system 700 including a vehicle 710 (e.g., an autonomous vehicle with one or more features of the vehicle 108 depicted in FIG. 1), an object 720 (e.g., a bicycle), a receptacle 730, and a receptacle cover 732 (e.g., a portion of the receptacle 730 that can cover a portion of one or more objects including the object 720).

In this example, the receptacle 730 is carrying the object 720 which is partly covered by the receptacle cover 732. The receptacle cover 732 can cover some part or all of an object that is placed in the receptacle 730. In some embodiments, the receptacle cover 732 can be fixed in place, retractable, or configured to be placed in various positions that can cover some portion of one or more objects that are in the receptacle 730. In some embodiments, the receptacle cover 732 can be include one or more fabric portions that can be retracted into the receptacle 730 to be stored and extended to cover some portion of one or more objects in the receptacle 730.

In some embodiments, the vehicle 710 can perform one or more operations including determining one or more states of a receptacle (e.g., the receptacle 730 and/or the receptacle 150 depicted in FIG. 1) of a vehicle (e.g., the vehicle 710 and/or the vehicle 108 depicted in FIG. 1). The one or more states of the receptacle can be associated with accommodation of one or more objects (e.g., the object 720) by the receptacle. The operations can also include receiving object data including information associated with accommodation of the one or more objects by the receptacle. The operations can include determining one or more operations associated with the receptacle based at least in part on the object data and the one or more states of the receptacle. Furthermore, the operations can include generating one or more control signals to perform the one or more operations associated with the receptacle (e.g., determining the state of the receptacle 730 and/or the receptacle cover 732).

Figure 8:
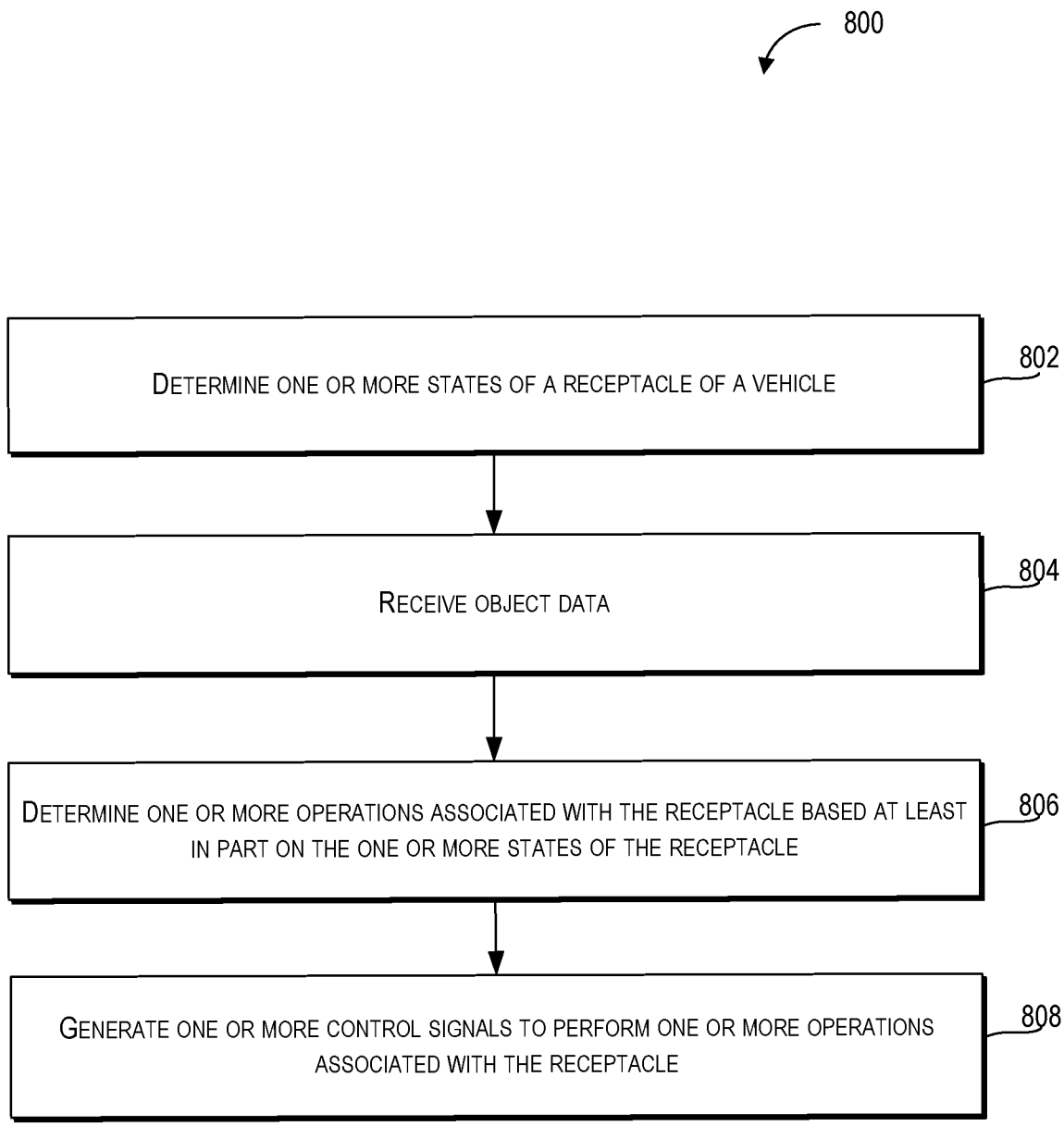
FIG. 8 depicts a flow diagram of an example method of using a receptacle system according to example embodiments of the present disclosure.

FIG. 8 depicts a flow diagram of an example method of using a receptacle system according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1) to, for example, generate control signals to perform operations based on the state of a receptacle associated with a vehicle. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include determining one or more states of a receptacle (e.g., a receptacle associated with a vehicle). The one or more states of the receptacle can be associated with accommodation of one or more objects by the receptacle. The receptacle can include one or more devices (e.g., trays, platforms, shelves, and/or racks) that can be used to carry and/or contain one or more objects including bicycles, electric bicycles, and/or cargo (e.g., food crates). By way of further example, the vehicle computing system 112 can receive one or more signals or data from one or more sensors (e.g., the one or more sensors 114 of the vehicle 108) in the receptacle 150 to determine when the receptacle 150 is retracted inside the vehicle 108, extended from the vehicle 108, and/or charging an object that is in the receptacle 150.

In some embodiments, the receptacle can be retractable into the vehicle and/or extendable from the vehicle. The receptacle system can use one or more motors to retract and/or extend the receptacle into some portion of the vehicle. By way of example, the vehicle computing system 112 send one or more signals to the receptacle 150 to retract the receptacle into the vehicle 108 or extend the receptacle into the vehicle 108. Furthermore, the receptacle (e.g., the receptacle 150) can be retracted into or extended from various portions of the vehicle (e.g., the vehicle 108) including a front portion of the vehicle, a rear portion of the vehicle, a side portion of the vehicle, underneath the vehicle, or the top of the vehicle.

In some embodiments, the receptacle can include one or more portions associated with accommodating one or more particular types of the one or more objects. One or more portions of the receptacle can be different sizes and/or shapes in order to accommodate various types of objects. For example, one or more portions of the receptacle 150 can be shaped to accommodate specific types of objects (e.g., a square shaped groove in the receptacle 150 can accommodate a square box containing cargo). By way of further example, the one or more portions of the receptacle 150 can include one or more portions (e.g., electrical outlets, conductive charging panels, and/or induction chargers) that can provide electrical power that can be used to charge various objects.

In some embodiments, the one or more objects can include one or more bicycles, one or more electric bicycles, one or more scooters, and/or cargo (e.g., loose cargo contained in container portions of the receptacle and/or cargo in its own container). Furthermore, the receptacle (e.g., the receptacle 150) can include one or more indications that can be used to indicate the type of the one or more objects that can be carried in respective portions of the receptacle. For example, the receptacle can include text indications (e.g., "PLACE CARGO HERE"), pictures (e.g., a picture of a bicycle to indicate that a portion of the receptacle is for accommodation of a bicycle), and/or color coding (e.g., red color coding to indicate areas where an object should not be placed in the receptacle).

In some embodiments, the receptacle can include one or more ramps, which can be located at various locations of the receptacle including being located at one or more distal portions of the receptacle. For example, the receptacle 150 can include one or more ramps that facilitate placing objects with wheels (e.g., scooters) onto the receptacle 150 from the ground adjacent to the receptacle. The one or more ramps can allow an object to be rolled onto the receptacle without having to lift the object.

In some embodiments, the one or more states of the receptacle can include one or more of an available state, a vacant state, or a charging state. For example, in some implementations, the receptacle 150 can include one or more display devices with lighting elements (LEDs) that can generate different colors based on the state of the receptacle (e.g., green when the receptacle 150 is available, red when the receptacle 150 is unavailable, and/or blue when the receptacle 150 is charging a device).

In some embodiments, the receptacle can include one or more indicators that can be configured to indicate one or more states of the receptacle. Further, each of the one or more states of the receptacle can be indicated by text, one or more symbols, or one or more colors. For example, in some implementations, the receptacle can include one or more display devices that display the word "AVAILABLE" when the receptacle is available, "VACANT" when the receptacle is vacant, or "CHARGING" when the receptacle is charging an object. By way of further example, in some implementations, the receptacle 150 can include one or more audio devices that generate a sound (e.g., beeping or chiming) when the receptacle 150 is being retracted and/or extended. Further, different portions of the receptacle can be used to indicate different states. For example, the receptacle 150 can include four sections of which one occupied section carrying a non-charging object (e.g., a bicycle) is indicated by a red light, one occupied section carrying a charging object (e.g., an electric bicycle) is indicated by a blue light, and two unoccupied sections are indicated by green lights.

At 804, the method 800 can include receiving object data including information associated with accommodation of the one or more objects by the receptacle. For example, the vehicle computing system 112 can receive object data including information associated with a request to place a particular object (e.g., a scooter) in the receptacle 150. Further, the vehicle computing system 112 can receive the object data via one or more networks (e.g., the communications network 102) from one or more sources including a personal computing device (e.g., smartphone).

In some embodiments, the object data can include information associated with one or more physical dimensions of each of the one or more objects, a type of each of the one or more objects, a user associated with each of the one or more objects, or a mass of each of the one or more objects. For example, the vehicle computing system 112 can receive object data from an article of cargo including an indication that the object is a box with a particular set of dimensions (e.g., a cube measuring half a meter per side) and that the cargo is fragile and should be placed in a specially padded portion of the receptacle 150.

In some embodiments, the object data can include information associated with authorization to access the receptacle. For example, the vehicle computing system 112 can receive object data including one or more access codes transmitted wirelessly from an object (e.g., transmitted from an electrical bicycle) to the receptacle system 150. Further, the one or more access codes can include information used to secure an object in the receptacle 150 and/or release an object that is secured in the receptacle 150. In this way, access to each of the one or more objects in the receptacle can be restricted based on use of the one or more access codes.

At 806, the method 800 can include determining one or more operations associated with the receptacle based at least in part on the object data and the one or more states of the receptacle. For example, the vehicle computing system 112 can use the object data and the one or more states of the receptacle 150 to determine one or more operations associated with the receptacle 150 including granting access to one or more portions of the receptacle 150, charging an object in the receptacle 150, locking an object in the receptacle 150, unlocking an object in the receptacle 150, extending the receptacle 150 from the vehicle 108, and/or retracting the receptacle 150 into the vehicle 109.

At 808, the method 800 can include generating one or more control signals to perform the one or more operations associated with the receptacle. For example, the vehicle computing system 112 can generate one or more control signals including electronic signals and/or data associated with performing the one or more operations. Further, the one or more control signals can include signals that are encoded with data that includes instructions for operations to be performed by the receptacle 150 (e.g., instructions to generate one or more indications on the receptacle, change the position of the receptacle, and/or provide access to one or more portions of the receptacle 150). In some embodiments, the one or more control signals can be transmitted via a wired interconnection and/or wirelessly including for example, via an antenna.

Figure 9:
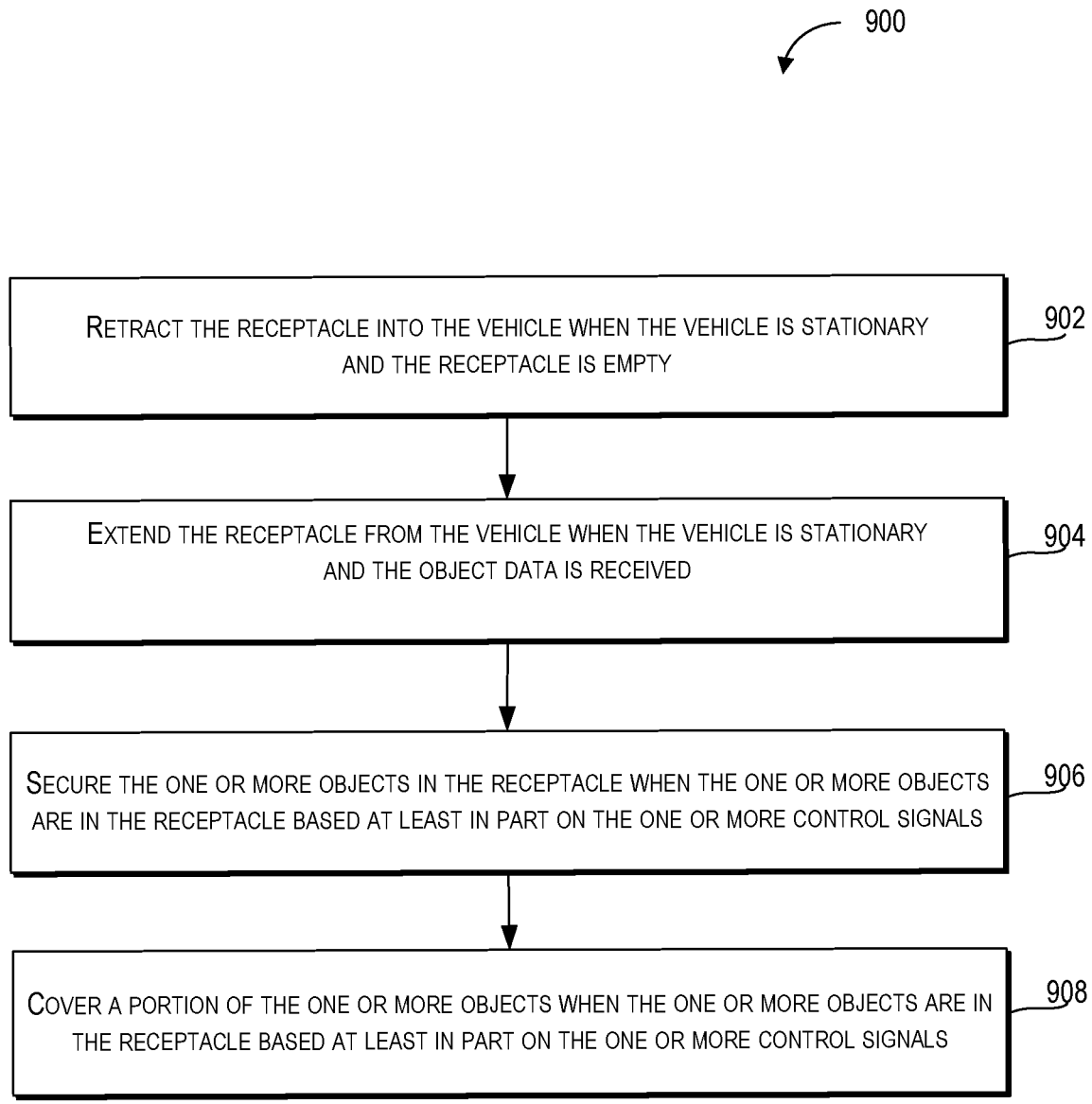
FIG. 9 depicts a flow diagram of an example method of using a receptacle system according to example embodiments of the present disclosure.

FIG. 9 depicts a flow diagram of an example method of using a receptacle system according to example embodiments of the present disclosure. One or more portions of a method 900 can be implemented by one or more devices (e.g., one or more computing devices) or systems including, for example, the operations computing system 104, the vehicle 108, or the vehicle computing system 112, shown in FIG. 1. Moreover, one or more portions of the method 900 can be implemented as an algorithm on the hardware components of the devices described herein (e.g., as in FIG. 1) to, for example, generate control signals to perform operations based on the state of a receptacle associated with a vehicle. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 900 can be performed as part of the method 800 that is depicted in FIG. 8.

At 902, the method 900 can include retracting the receptacle (e.g., the receptacle of the method 800) into the vehicle (e.g., the vehicle of the method 800) when vehicle is stationary and the receptacle is empty. For example, the vehicle computing system 112 can determine, based at least in part on data from one or more sensors of the vehicle 108 (e.g., motion sensors including accelerometers) that the vehicle 108 is stationary. Further, the vehicle computing system 112 can determine, based at least in part on the force exerted by one or more objects on weight sensors and/or pressure sensors of the receptacle 150 when the receptacle is empty (e.g., there are not objects in the receptacle 150). In response to the vehicle computing system 112 determining that the vehicle 108 is stationary and the receptacle 150 is empty, the vehicle computing system 112 can send one or more control signals to motors of the receptacle 150 and/or the vehicle 108, that can retract the receptacle 150 into the vehicle 108. By way of further example, as shown in FIG. 2, the receptacle 230 can be retracted inside the vehicle 210.

At 904, the method 900 can include extending the receptacle from the vehicle when the vehicle is stationary and the object data (e.g., the object data of the method 800) is received. For example, the vehicle computing system 112 can determine, based at least in part on data from one or more sensors of the vehicle 108 (e.g., wheel sensors of the vehicle 108) that the vehicle is stationary and can, in response to receiving object data including a request to place an object in the receptacle 150, extend the receptacle 150 from inside the vehicle using one or more motors of the vehicle 108 and/or the receptacle 150. Furthermore, extending the receptacle (e.g., the receptacle 150 that is depicted in FIG. 1) can include unfolding, lowering, raising, and/or sliding one or more portions of the receptacle so that the receptacle is positioned to carry and/or transport one or more objects. By way of further example, as shown in FIG. 2, the receptacle 232 can extend from inside the vehicle 212.

At 906, the method 900 can include securing (e.g., fixing an object in place on the receptacle, fastening an object to the receptacle, and/or attaching an object to the receptacle or attaching portions of the receptacle to the object) the one or more objects (e.g., the one or more objects of the method 800) to the receptacle when the one or more objects are in the receptacle based at least in part on the one or more control signals (e.g., the one or more control signals of the method 800). For example, the vehicle computing system 112 can include one or more motors that can, in response to receiving one or more control signals, hold and/or grasp the one or more objects in place when the one or more objects are in the receptacle 150. By way of further example, as shown in FIG. 5, the receptacle system 500 can include a computing system that can generate one or more control signals to secure the object 520 in the receptacle 530.

In some embodiments, securing the one or more objects can include grasping the one or more objects in one or more grasping members of the receptacle or magnetically coupling one or more magnetic portions of the one or more objects to the receptacle, including via one or more electromagnets, ferromagnetic magnets, or other types of magnets. For example, when an object (e.g., an electric bicycle) is placed in the receptacle 150, a securing mechanism can come down over the object to secure it in the receptacle. By way of further example, an electromagnet of the receptacle 150 can be activated when the vehicle computing system 112 sends one or more control signals to provide electric current to the electromagnet of the receptacle 150, thereby securing a magnetic object in the receptacle 150. Further, the vehicle computing system 112 can send one or more control signals to stop the flow of current to an electromagnet of the receptacle, thereby releasing a magnetic object in the receptacle 150.

At 908, the method 900 can include covering a portion of the one or more objects when the one or more objects are in the receptacle based at least in part on the one or more control signals. For example, when one or more objects are placed in the receptacle 150, the vehicle computing system 112 can generate one or more control signals that can be used to activate motors that move a cover portion of the receptacle 150 to cover some part of the one or more objects in the receptacle 150. By way of further example, as shown in FIG. 7, the receptacle system 700 can include a computing system that can generate one or more control signals to cover a portion of the object 720 with the receptacle cover 732 of the receptacle 730.

Figure 10:
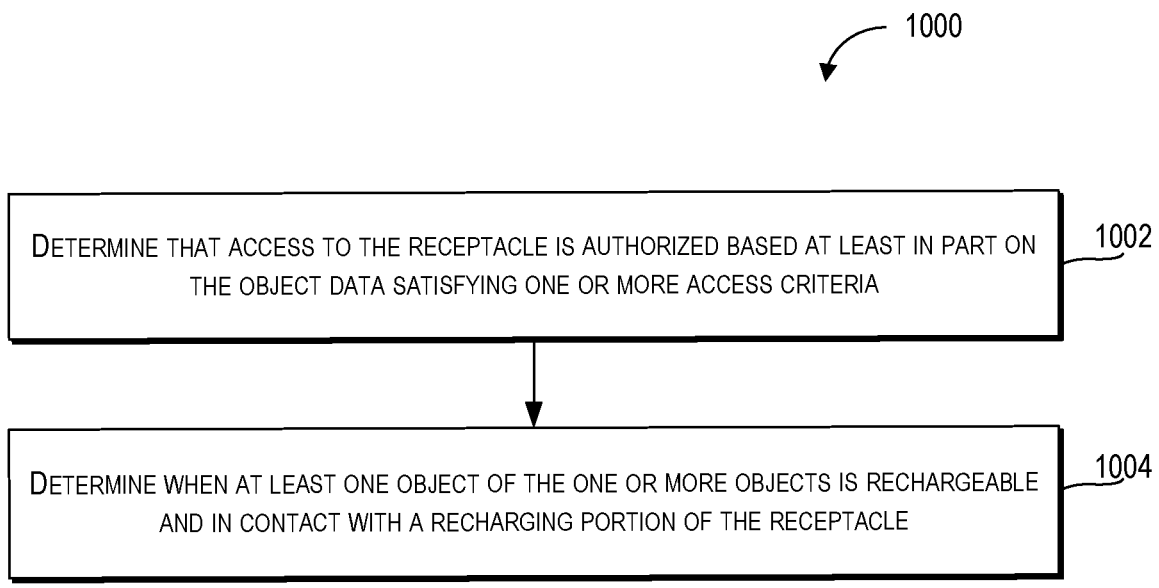
FIG. 10 depicts a flow diagram of an example method of using a receptacle system according to example embodiments of the present disclosure.

FIG. 10 depicts a flow diagram of an example method of using a receptacle system according to example embodiments of the present disclosure. One or more portions of a method 1000 can be implemented by one or more devices (e.g., one or more computing devices) or systems including, for example, the operations computing system 104, the vehicle 108, or the vehicle computing system 112, shown in FIG. 1. Moreover, one or more portions of the method 1000 can be implemented as an algorithm on the hardware components of the devices described herein (e.g., as in FIG. 1) to, for example, generate control signals to perform operations based on the state of a receptacle associated with a vehicle. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 1000 can be performed as part of the method 800 that is depicted in FIG. 8.

At 1002, the method 1000 can include determining that access to the receptacle (e.g., the receptacle of the method 800) is authorized based at least in part on the object data (e.g., the object data of the method 800) satisfying one or more access criteria. For example, the object data can include an access code that is sent wirelessly from a computing device of a user associated with an object to the vehicle computing system 112 when the object is in the receptacle 150. The vehicle computing system 112 can then perform one or more operations upon receiving the object data including the access code including comparing the access code to an access code associated with the object in the receptacle 150. Furthermore, the one or more operations associated with the receptacle can include determining whether the access code authorizes removal of an object from the receptacle 150.

In some embodiments, determining that access to the receptacle is authorized based at least in part on the object data satisfying one or more access criteria can be used in determining one or more operations associated with the receptacle based at least in part on the object data and the one or more states of the receptacle as described in 806 of the method 800 that is depicted in FIG. 8.

In some embodiments, satisfying the one or more access criteria can include the object data including one or more object access codes that match one or more receptacle access codes associated with providing access to the receptacle or the receptacle having sufficient space to accommodate the one or more objects. For example, the vehicle computing system 112 can receive one or more sensor outputs from the one or more sensors 114 that can be used to determine physical dimensions of an object included in object data associated with the object. The vehicle computing system 112 can then compare the physical dimensions of the object to an available capacity of the receptacle 150 and/or one or more receptacle apertures 152 of the receptacle 150. When the physical dimensions of the object are less than the available capacity of the receptacle 150, the vehicle computing system 112 can determine that the receptacle has sufficient space to accommodate the object. By way of further example, in some embodiments, the vehicle computing system 112 can compare the physical dimensions of an object to an available capacity range of the receptacle 150 which can include a minimum size and a maximum size. In this way, an object that is too small for a receptacle (e.g., small enough that the object is loose in the receptacle or otherwise not secure in the receptacle) is not carried and/or transported in the receptacle. Further, a minimum size for a receptacle can in some circumstances allow for more efficient use of the receptacle so that smaller objects (e.g., smaller backpacks) that can be conveniently carried inside the vehicle do not occupy space on the receptacle.

At 1004, the method 1000 can include determining when at least one object of the one or more objects (e.g., the one or more objects of the method 800) is rechargeable and positioned in a recharging portion of the receptacle (e.g., in contact with a recharging portion of the receptacle, positioned in a particular location with respect to a recharging portion of the receptacle, or within a predetermined distance of a recharging portion of the receptacle). For example, the vehicle computing system 112 can receive object data from an object. The object data can include an indication of whether the object is rechargeable (e.g., a chargeable scooter). Further, the vehicle computing system 112 can be associated with the one or more sensors 114 that can detect when a portion of an object (e.g., an object identified as being rechargeable by the receptacle system based at least in part on an object data) is positioned in a recharging portion (e.g., plugged into a plug-in charger, contacting a conductive charging panel, or positioned adjacent to an induction charger) of the receptacle 150. By way of further example, as shown in FIG. 2, the receptacle 234 can recharge the object 224 when the object 224 is in the receptacle 234.

In some embodiments, determining when at least one object of the one or more objects is rechargeable and positioned in a recharging portion of the receptacle can be used in determining one or more operations associated with the receptacle based at least in part on the object data and the one or more states of the receptacle as described in 806 of the method 800 that is depicted in FIG. 8.

Furthermore, in some embodiments, the one or more operations associated with the receptacle can include recharging the at least one object when the at least one object is rechargeable and positioned within the recharging portion of the receptacle. For example, the vehicle computing system 112 can send one or more control signals to activate the supply of electrical power from a recharging portion of the receptacle 150 to the object when one or more sensors of the receptacle 150 detect that the object is in contact with the recharging portion of the receptacle 150.

In some embodiments, recharging the at least one object includes recharging the at least one object via one or more solar power sources of the vehicle. For example, the vehicle 108 can include one or more solar panels on the top of the vehicle 108 that are used to charge batteries of the vehicle 108 that can provide electricity for the receptacle 150 to use in charging an object that is in the receptacle 150.

Figure 11:
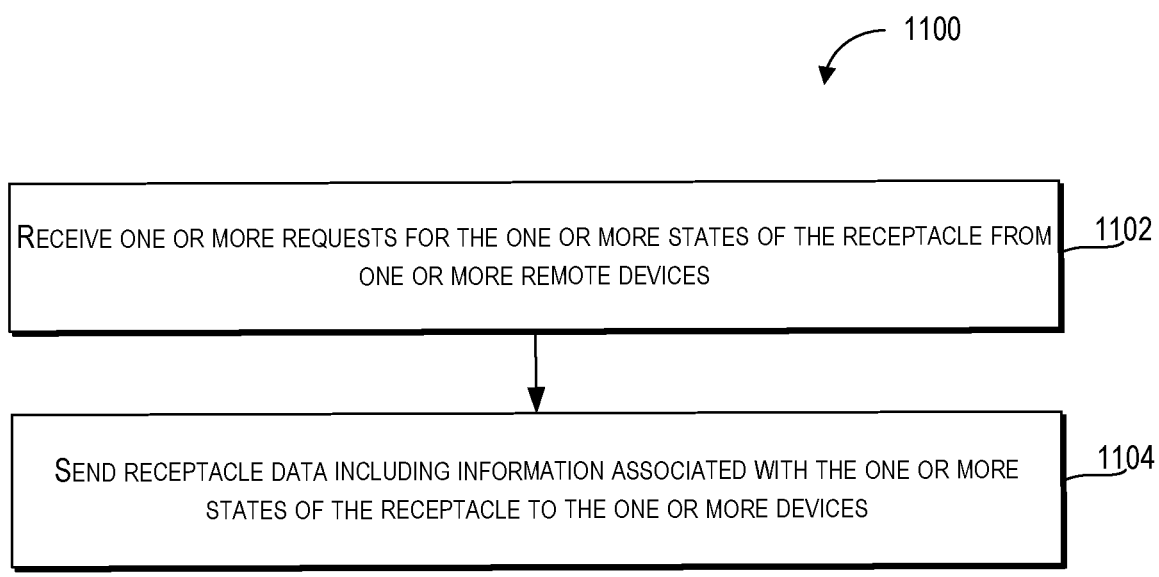
FIG. 11 depicts a flow diagram of an example method of using a receptacle system according to example embodiments of the present disclosure.

FIG. 11 depicts a flow diagram of an example method of using a receptacle system according to example embodiments of the present disclosure. One or more portions of a method 1100 can be implemented by one or more devices (e.g., one or more computing devices) or systems including, for example, the operations computing system 104, the vehicle 108, or the vehicle computing system 112, shown in FIG. 1. Moreover, one or more portions of the method 1100 can be implemented as an algorithm on the hardware components of the devices described herein (e.g., as in FIG. 1) to, for example, generate control signals to perform operations based on the state of a receptacle associated with a vehicle. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 1100 can be performed as part of the method 800 that is depicted in FIG. 8.

At 1102, the method 1100 can include receiving one or more requests for the one or more states of the receptacle (e.g., the receptacle of the method 800) from one or more remote devices (e.g., one or more user devices including smart phones, one or more laptop computers, and/or one or more server computing devices). For example, the vehicle computing system 112 can receive, via the communications network 102, request data including information associated with one or more requests for the location (e.g., geographic location) and availability (e.g., how much of the receptacle 150 is available) from the one or more remote computing devices 106 (e.g., smart phones) belonging to users desiring to place an object (e.g., a scooter or a package) on the receptacle 150.

At 1104, the method 1100 can include sending receptacle data including information associated with the one or more states of the receptacle to the one or more devices. The one or more states of the receptacle can include a location of the receptacle and/or an availability of the receptacle. For example, in response to a request for an available receptacle, the vehicle computing system 112 can send, via the communications network 102, one or more signals or data including a response indicating that the receptacle 150 is at a particular location (e.g., a street address of the receptacle 150) and that the receptacle 150 has available space for one article of cargo and two electric bicycles.

Figure 12:
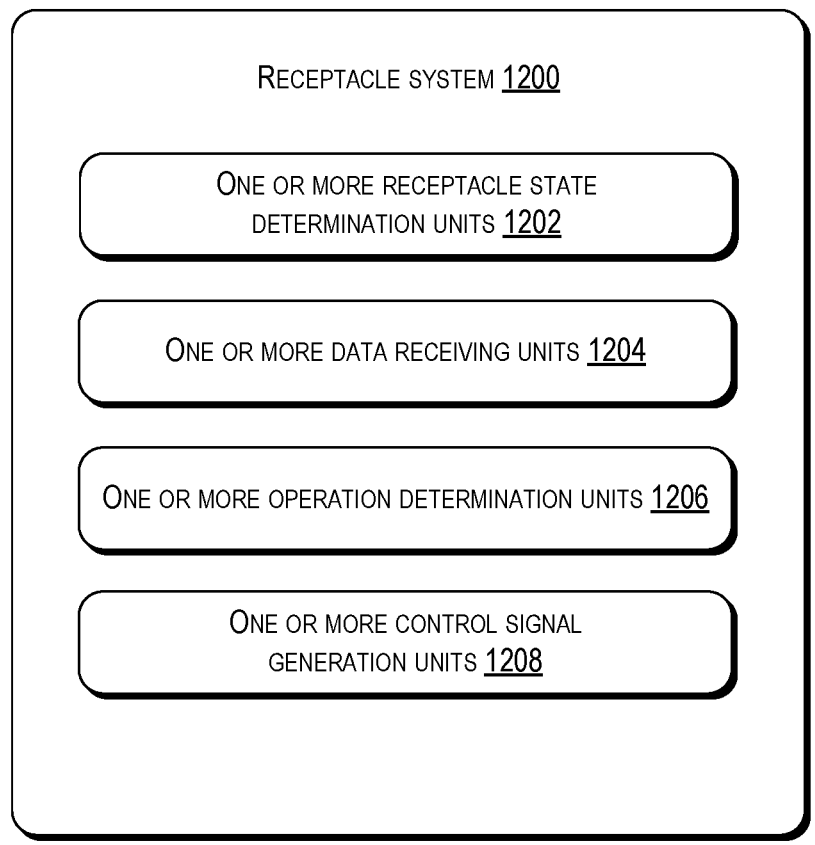
FIG. 12 depicts an example system including units for performance of operations and functions according to example embodiments of the present disclosure.

FIG. 12 depicts an example of a receptacle system according to example embodiments of the present disclosure. One or more operations and/or functions or operations in FIG. 12 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 12 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a receptacle system 1200 can include one or more receptacle state determination units 1202, one or more data receiving units 1204, one or more operation determination units 1206, one or more control signal generation units 1208, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a receptacle system) or configured (e.g., an ASIC custom designed and configured to operate a receptacle system) to perform one or more algorithms for performing the operations and functions described herein. For example, the means (e.g., the one or more receptacle state determination units 1202) can be configured to determine one or more states of a receptacle (e.g., the receptacle 150 that is depicted in FIG. 1) of a vehicle (e.g., the vehicle 108 that is depicted in FIG. 1) in which the one or more states of the receptacle are associated with accommodation of one or more objects (e.g., bicycles, electrical bicycles, and/or various cargo) by the receptacle. In some implementations, the means (e.g., the one or more receptacle state determination units 1202) can be configured to determine when the receptacle is in an available state, a vacant state, or a charging state.

Furthermore, the means (e.g., the one or more data receiving units 1204) can be configured to receive object data including information associated with accommodation of one or more objects by a receptacle. In some implementations, the means (e.g., the one or more data receiving units 1204) can be configured to receive object data associated with authorization to access the receptacle (e.g., object data including one or more object access codes). Further, in some implementations, the means (e.g., the one or more data receiving units 1204) can be configured to receive object data that includes information associated with one or more physical dimensions of each of the one or more objects, a type of each of the one or more objects, a user associated with each of the one or more objects, or a mass of each of the one or more objects.

Furthermore, the means (e.g., the one or more operation determination units 1206) can be configured to determine one or more operations associated with the receptacle based at least in part on the object data and the one or more states of the receptacle. In some implementations, the means (e.g., the one or more operation determination units 1206) can be configured to determine, based at least in part on the object data satisfying one or more access criteria, that access to the receptacle is authorized. Further, in some implementations, the means (e.g., the one or more operation determination units 1206) can be configured to determine when at least one object of the one or more objects is rechargeable and in contact with a recharging portion of the receptacle.

Furthermore, the means (e.g., the one or more control signal generation units 1208) can be configured to generate one or more control signals to perform the one or more operations associated with the receptacle. In some implementations, the means (e.g., the one or more control signal generation units 1208) can be configured to extend and/or retract a receptacle respectively from and into a vehicle associated with a receptacle system. Further, in some implementations the means (e.g., the one or more control signal generation units 1208) can be configured to secure and/or cover one or more objects in a receptacle of a receptacle system. Furthermore, in some implementations the means (e.g., the one or more control signal generation units 1208) can be configured to receive one or more requests for the one or more states of the receptacle from one or more devices (e.g., remote computing devices including smart phones); and send receptacle data including information associated with the one or more states of the receptacle to the one or more devices.

Figure 13:
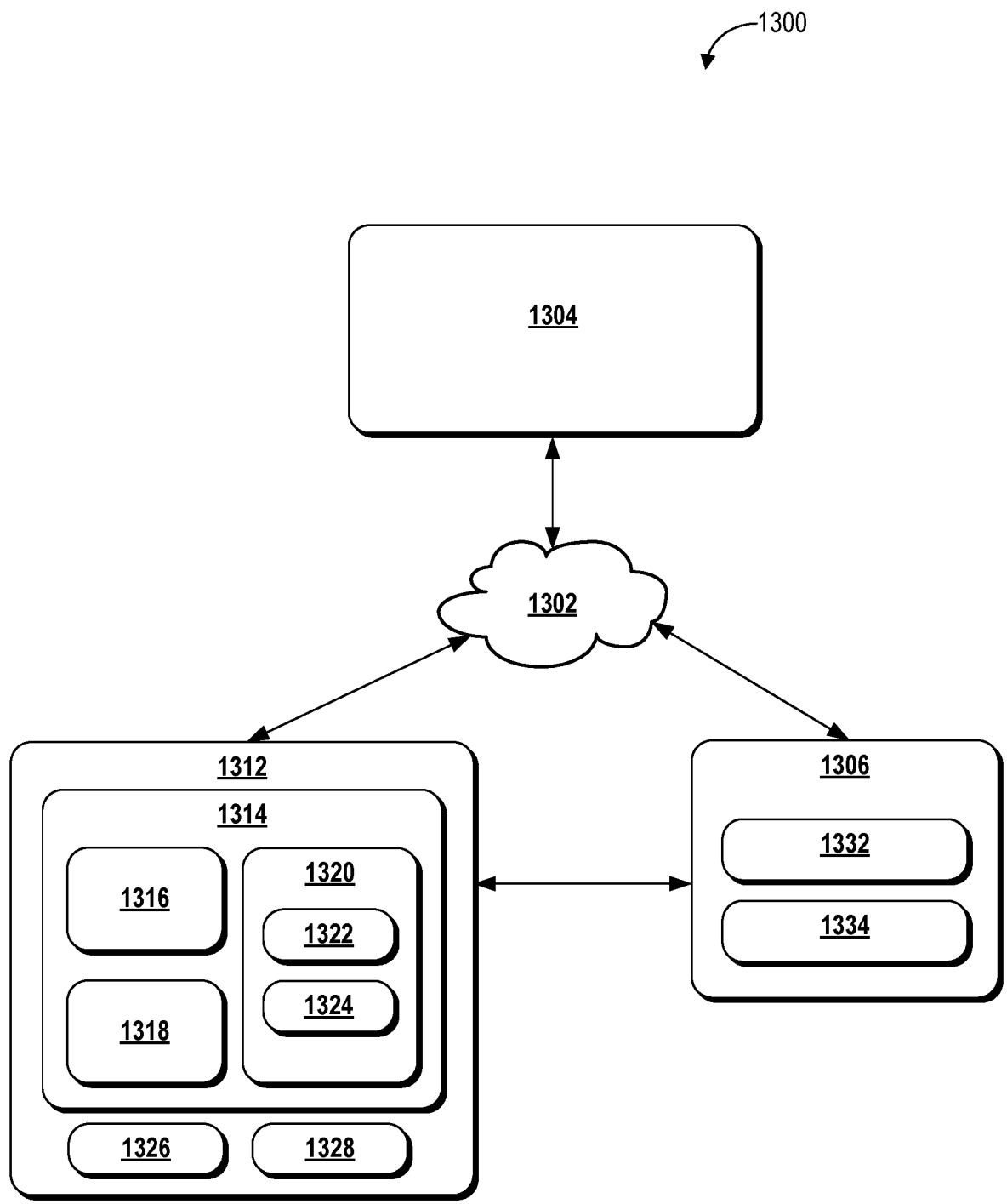
FIG. 13 depicts a diagram of an example system according to example embodiments of the present disclosure.

FIG. 13 depicts a diagram of an example system according to example embodiments of the present disclosure. A system 1300 can include a network 1302 which can include one or more features of the communications network 102 depicted in FIG. 1; an operations computing system 1304 which can include one or more features of the operations computing system 104 depicted in FIG. 1; one or more computing devices 1306 which can include one or more features of the one or more remote computing devices 106 depicted in FIG. 1; a vehicle computing system 1312 which can include one or more features of the vehicle computing system 112 depicted in FIG. 1; one or more computing devices 1314; a communication interface 1316; one or more processors 1318; one or more memory devices 1320; memory system 1322; memory system 1324; one or more input devices 1326; one or more output devices 1328; one or more input devices 1332; and one or more output devices 1334.

The vehicle computing system 1312 can include the one or more computing devices 1314. The one or more computing devices 1314 can include one or more processors 1318 which can be included on-board a vehicle including the vehicle 108 and one or more memory devices 1320 which can be included on-board a vehicle including the vehicle 108. The one or more processors 1318 can be any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 1318 can include a single processor or a plurality of processors that are operatively and/or selectively connected. The one or more memory devices 1320 can include one or more non-transitory computer-readable storage media, such as RAM, ROM, EEPROM, EPROM, flash memory devices, magnetic disks, and/or combinations thereof.

The one or more memory devices 1320 can store data or information that can be accessed by the one or more processors 1318. For instance, the one or more memory devices 1320 which can be included on-board a vehicle including the vehicle 108, can include a memory system 1322 that can store computer-readable instructions that can be executed by the one or more processors 1318. The memory system 1322 can include software written in any suitable programming language that can be implemented in hardware (e.g., computing hardware). Further, the memory system 1322 can include instructions that can be executed in logically and/or virtually separate threads on the one or more processors 1318. The memory system 1322 can include any set of instructions that when executed by the one or more processors 1318 cause the one or more processors 1318 to perform operations.

For example, the one or more memory devices 1320 which can be included on-board a vehicle including the vehicle 108 can store instructions, including specialized instructions, that when executed by the one or more processors 1318 on-board the vehicle cause the one or more processors 1318 to perform operations including any of the operations and/or functions of the one or more computing devices 1314 or for which the one or more computing devices 1314 are configured, including the operations for determining one or more states of a receptacle (e.g., the receptacle 150 which can have states that can be determined by the one or more sensors 114) of a vehicle (e.g., the vehicle 108), in which the one or more states of the receptacle can be associated with accommodation of one or more objects by the receptacle; receiving object data including information associated with accommodation of the one or more objects (e.g., any type of object including bicycles, electric bicycles, and/or cargo) by the receptacle; determining one or more operations associated with the receptacle based at least in part on the object data and the one or more states of the receptacle; and generating one or more control signals to perform the one or more operations associated with the receptacle (e.g., moving and/or maneuvering the receptacle 150), and/or any other operations and/or functions for operation of a vehicle, as described in the present disclosure.

The one or more memory devices 1320 can include a memory system 1324 that can store data that can be retrieved, manipulated, created, and/or stored by the one or more computing devices 1314. The data stored in memory system 1324 can include, for instance, sensor data associated with a vehicle including the vehicle 108; object data including data associated with one or more objects that can be placed in the receptacle 150; data associated with user input; data associated with one or more actions and/or control command signals; data associated with users; and/or other data or information. The data in the memory system 1324 can be stored in one or more databases. The one or more databases can be split up so that they are located in multiple locales on-board a vehicle which can include the vehicle 108. In some implementations, the one or more computing devices 1314 can obtain data from one or more memory devices that are remote from a vehicle (e.g., the vehicle 108).

The system 1300 can include the network 1302 (e.g., a communications network) that can be used to exchange (send or receive) signals (e.g., electronic signals) or data (e.g., data from a computing device) including signals or data exchanged between computing devices including the operations computing system 1304, the one or more computing devices 1306, and/or the vehicle computing system 1312. The network 1302 can include any combination of various wired (e.g., twisted pair cable) and/or wireless communication mechanisms (e.g., cellular, wireless, satellite, microwave, and radio frequency) and/or any desired network topology (or topologies). For example, the communications network 1302 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 1314 can also include the communication interface 1316 used to communicate with one or more other systems which can be included on-board a vehicle including the vehicle 108 (e.g., over the network 1302). The communication interface 1316 can include any suitable components for interfacing with one or more networks, including for example, transmitters, receivers, ports, controllers, antennas, other hardware and/or software.

The vehicle computing system 1312 can also include one or more input devices 1326 and/or one or more output devices 1328. The one or more input devices 1326 and/or the one or more output devices 1328 can be included and/or otherwise associated with a human-machine interface system. The one or more input devices 1326 can include, for example, hardware for receiving information from a user, such as a touch screen, touch pad, mouse, data entry keys, speakers, and/or a microphone suitable for voice recognition. The one or more output devices 1328 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The one or more computing devices 1306 can include various types of computing devices. For example, the one or more computing devices 1306 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more computing devices 1306 can be associated with a user. The one or more computing devices 1306 described herein can also be representative of a user device that can be included in the human machine interface system of a vehicle including the vehicle 108.

The one or more computing devices 1306 can include one or more input devices 1332 and/or one or more output devices 1334. The one or more input devices 1332 can include, for example, hardware for receiving information from a user, such as a touch screen, touch pad, mouse, data entry keys, speakers, and/or a microphone suitable for voice recognition. The one or more output devices 1334 can include hardware for providing content for display. For example, the one or more output devices 1334 can include a display device (e.g., display screen, CRT, LCD), which can include hardware for a user interface.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
   determining one or more states of a receptacle of a vehicle, wherein the one or more states of the receptacle are associated with accommodation of one or more objects by the receptacle;
   receiving object data comprising information associated with accommodation of an object by the receptacle;
   determining a type of the object based at least in part on the object data, wherein the type of object comprises an electric bicycle or scooter;
   determining one or more operations associated with the receptacle based at least in part on the type of the object and the one or more states of the receptacle, wherein at least one operation is associated with charging the object; and generating one or more control signals to perform the one or more operations associated with the receptacle.

2. The computer-implemented method of claim 1, wherein the object data further comprises information associated with an authorization to access the receptacle, and wherein determining the one or more operations associated with the receptacle comprises:

determining that access to the receptacle is authorized based at least in part on the object data satisfying one or more access criteria, wherein the one or more operations comprise providing the access to the receptacle for the object.

3. The computer-implemented method of claim 2, wherein the object data satisfying the one or more access criteria comprises one or more object access codes that match one or more receptacle access codes associated with providing access to the receptacle or the receptacle having sufficient space to accommodate the object.

4. The computer-implemented method of claim 1, wherein determining the one or more operations associated with the receptacle comprises:

determining that the object is rechargeable and positioned in a recharging portion of the receptacle, wherein the one or more operations associated with the receptacle comprise recharging the object.

5. The computer-implemented method of claim 4, wherein recharging the object comprises recharging the object via one or more solar power sources of the vehicle.

6. The computer-implemented method of claim 1, wherein the receptacle is retractable into the vehicle or extendable from the vehicle.

7. The computer-implemented method of claim 1, further comprising:

determining the vehicle is stationary; and extending the receptacle from the vehicle based at least in part on the determination that the vehicle is stationary and the object data.

8. The computer-implemented method of claim 1, further comprising:

determining the vehicle is stationary and the receptable is empty; and retracting the receptacle into the vehicle based at least in part on the determination that vehicle is stationary and the receptacle is empty.

9. The computer-implemented method of claim 1, further comprising:

securing the object to the receptacle when the object is in the receptacle based at least in part on the one or more control signals.

10. The computer-implemented method of claim 9, wherein securing the object comprises grasping the object in one or more grasping members of the receptacle or magnetically coupling one or more magnetic portions of the object to the receptacle.

11. The computer-implemented method of claim 1, further comprising:

covering a portion of the object when the object is in the receptacle based at least in part on the one or more control signals.

12. The computer-implemented method of claim 1, further comprising:

receiving one or more requests for the one or more states of the receptacle from one or more remote devices; and sending receptacle data comprising information associated with the one or more states of the receptacle to the one or more remote devices, wherein the one or more states of the receptacle comprise a location of the receptacle or an availability of the receptacle.

13. The computer-implemented method of claim 1, wherein the receptacle comprises one or more portions associated with accommodating a plurality of types of objects.

14. The computer-implemented method of claim 13, wherein the plurality of types of objects further comprise: cargo.

15. A computing device comprising:

one or more processors;

a memory comprising one or more computer-readable media, the memory storing computer-readable instructions that are executable by the one or more processors to cause the one or more processors to perform operations comprising:

determining one or more states of a receptacle of a vehicle, wherein the one or more states of the receptacle are associated with accommodation of one or more objects by the receptacle;

receiving object data comprising information associated with accommodation of an object by the receptacle;

determining a type the object based at least in part on the object data, wherein the type of object comprises an electric bicycle or scooter;

determining one or more operations associated with the receptacle based at least in part the type of the object and the one or more states of the receptacle, wherein at least one operation is associated with charging the object; and generating one or more control signals to perform the one or more operations associated with the receptacle.

16. The computing device of claim 15, wherein the receptacle comprises one or more ramps located at one or more distal portions of the receptacle.

17. The computing device of claim 15, wherein the object data comprises at least one of: (a) information associated with one or more physical dimensions of the object, (b) a user associated with the object, or (c) a mass of the object.

18. One or more tangible non-transitory computer-readable media storing computer-readable instructions that are executable by one or more processors to cause the one or more processors to perform operations, the operations comprising:

determining one or more states of a receptacle of a vehicle, wherein the one or more states of the receptacle are associated with accommodation of one or more objects by the receptacle;

receiving object data comprising information associated with accommodation of an object by the receptacle;

determining a type of the object based at least in part on the object data, wherein the type of object comprises an electric bicycle or scooter;

determining one or more operations associated with the receptacle based at least in on the type of the object and the one or more states of the receptacle, wherein at least one operation is associated with charging the object; and generating one or more control signals to perform the one or more operations associated with the receptacle.

19. The one or more tangible non-transitory computer-readable media of claim 18, wherein the one or more states of the receptacle comprise at least one of: (a) an available state, (b) a vacant state, or (c) a charging state.

20. The one or more tangible non-transitory computer-readable media of claim 18, wherein the receptacle comprises one or more indicators configured to indicate the one or more states of the receptacle, and wherein each of the one or more states of the receptacle is indicated by at least one of: (a) text, (b) one or more symbols, or (c) one or more colors.

\* \* \* \* \*